US012666255B2

(12) United States Patent
Preda et al.

(10) Patent No.: US 12,666,255 B2
(45) Date of Patent: Jun. 23, 2026

(54) SELECTIVE USER PLANE PROTECTION IN 5G VIRTUAL RAN

(71) Applicant: Telefonaktiebolaget LM Ericsson (publ), Stockholm (SE)

(72) Inventors: Stere Preda, Longueuil (CA); Daniel Migault, Montreal (CA); Amine Boukhtouta, Laval (CA); Xiaowen Yue, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 292 days.

(21) Appl. No.: 17/911,682

(22) PCT Filed: Mar. 18, 2020

(86) PCT No.: PCT/IB2020/052482
§ 371 (c)(1),
(2) Date: Sep. 15, 2022

(87) PCT Pub. No.: WO2021/186215
PCT Pub. Date: Sep. 23, 2021

(65) Prior Publication Data
US 2023/0179996 A1 Jun. 8, 2023

(51) Int. Cl.
*H04W 12/03* (2021.01)
*G06F 21/10* (2013.01)
*H04W 12/033* (2021.01)

(52) U.S. Cl.
CPC .......... *H04W 12/033* (2021.01); *G06F 21/10* (2013.01)

(58) Field of Classification Search
CPC ............................ H04W 12/033; G06F 21/10
See application file for complete search history.

(56) References Cited

U.S. PATENT DOCUMENTS 6,680,922 B1 * 1/2004 Jorgensen ............... H04W 8/04
370/328
9,769,861 B2 9/2017 Yi et al.
(Continued)

FOREIGN PATENT DOCUMENTS

CN     110417708 A     11/2019
EP       3570577 A2    11/2019
(Continued)

OTHER PUBLICATIONS

Author Unknown, "Technical Specification Group Services and System Aspects; Security Aspects; Study on Security Impacts of Virtualisation (Release 16)," Technical Report 33.848, Version 0.5.0, Nov. 2019, 3GPP Organizational Partners, 34 pages.
(Continued)

*Primary Examiner* — Rupal Dharia
*Assistant Examiner* — Devin E Almeida
(74) *Attorney, Agent, or Firm* — Withrow & Terranova, PLLC

(57) ABSTRACT

Systems and methods for selective User Plane protection in a 5G virtual RAN are provided. A method performed by a gNB Central Unit (gNB-CU) for communicating with a gNB-Distributed Unit (gNB-DU) includes determining whether to selectively encrypt a PDU to be sent to the gNB-DU if the PDU is not otherwise encrypted. In response to determining to selectively encrypt, the method includes encrypting the PDU to be sent to the gNB-DU. In response to determining to not selectively encrypt, the method includes passing the PDU to be sent to the gNB-DU. In this way, additional security is provided while performance impact is minimized. In some embodiments, this provides a lower overhead on the gNB-CU-UP side compared to applying a generic protection of all PDUs. Additionally, the latency overhead is limited since a secure session establish-
(Continued)

ment and handshake is confined to the gNB-CU-UP-SEG domain instead of gNB-CU-UP to gNB-DU.

19 Claims, 17 Drawing Sheets

(56)                References Cited

U.S. PATENT DOCUMENTS

| | | | |
|---|---|---|---|
| 2015/0029944 A1* | 1/2015 | Nama | H04W 4/00 |
| | | | 370/329 |
| 2015/0117349 A1* | 4/2015 | Godley | H04L 69/04 |
| | | | 370/329 |
| 2017/0156165 A1 | 6/2017 | Krishnan et al. | |
| 2019/0053298 A1 | 2/2019 | Krishnan et al. | |
| 2019/0253881 A1* | 8/2019 | Gage | H04W 12/03 |
| 2020/0084618 A1* | 3/2020 | Teyeb | H04W 80/02 |
| 2020/0100102 A1* | 3/2020 | Xu | H04W 12/033 |
| 2020/0170051 A1 | 5/2020 | Krishnan et al. | |
| 2020/0170071 A1* | 5/2020 | Mildh | H04W 80/08 |
| 2020/0267623 A1* | 8/2020 | Altay | H04L 45/64 |
| 2020/0274651 A1* | 8/2020 | Yi | H04W 28/065 |

FOREIGN PATENT DOCUMENTS

| | | |
|---|---|---|
| WO | 2019139518 A1 | 7/2019 |
| WO | 2020049335 A1 | 3/2020 |

OTHER PUBLICATIONS

Author Unknown, "Technical Specification Group Services and System Aspects; System architecture for the 5G System (5GS); Stage 2 (Release 16)," Technical Specification 23.501, Version 16.3.0, Dec. 2019, 3GPP Organizational Partners, 417 pages.

Author Unknown, "Technical Specification Group Core Network and Terminals; General Packet Radio System (GPRS) Tunnelling Protocol User Plane (GTPv1-U) (Release 16)," Technical Specification 29.281, Version 16.0.0, Dec. 2019, 3GPP Organizational Partners, 33 pages.

Author Unknown, "Technical Specification Group Services and System Aspects; 3G security; Network Domain Security (NDS); IP network layer security (Release 16)," Technical Specification 33.210, Version 16.2.0, Jun. 2019, 3GPP Organizational Partners, 28 pages.

Author Unknown, "Technical Specification Group Services and System Aspects; Network Domain Security (NDS); Authentication Framework (AF) (Release 16)," Technical Specification 33.310, Version 16.2.0, Jun. 2019, 3GPP Organizational Partners, 56 pages.

Author Unknown, "Technical Specification Group Services and System Aspects; Security architecture and procedures for 5G system (Release 15)," Technical Specification 33.501, Version 15.4.0, Mar. 2019, 3GPP Organizational Partners, 187 pages.

Author Unknown, "Technical Specification Group Services and System Aspects; Security architecture and procedures for 5G system (Release 15)," Technical Specification 33.501, Version 15.6.0, Sep. 2019, 3GPP Organizational Partners, 190 pages.

Author Unknown, "Technical Specification Group Radio Access Network; NR; NR and NG-RAN Overall Description; Stage 2 (Release 16)," Technical Specification 38.300, Version 16.0.0, Dec. 2019, 101 pages.

Author Unknown, "Technical Specification Group Radio Access Network; NR; Radio Link Control (RLC) protocol specification (Release 15)," Technical Specification 38.322, Version 15.5.0, Mar. 2019, 3GPP Organizational Partners, 33 pages.

Author Unknown, "Technical Specification Group Radio Access Network; NR; Packet Data Convergence Protocol (PDCP) specification (Release 15)," Technical Specification 38.323, Version 15.5.0, Mar. 2019, 3GPP Organizational Partners, 26 pages.

International Search Report and Written Opinion for International Patent Application No. PCT/IB2020/052482, mailed Oct. 14, 2020, 14 pages.

Author Unknown, "Technical Specification Group Radio Access Network; NG-RAN; Architecture description (Release 16)," Technical Specification 38.401, Version 16.0.0, Dec. 2019, 3GPP Organizational Partners, 49 pages.

Author Unknown, "Technical Specification Group Radio Access Network; NG-RAN; NR user plane protocol (Release 15)," Technical Specification 38.425, Version 15.6.0, Jul. 2019, 3GPP Organizational Partners, 22 pages.

Author Unknown, "Technical Specification Group Radio Access Network; NG-RAN; F1 general aspects and principles (Release 15)," Technical Specification 38.470, Version 15.5.0, Mar. 2019, 3GPP Organizational Partners, 13 pages.

Author Unknown, "Technical Specification Group Radio Access Network; NG-RAN; F1 signalling transport (Release 15)," Technical Specification 38.472, Version 15.6.0, Dec. 2019, 3GPP Organizational Partners, 9 pages.

Author Unknown, "Technical Specification Group Radio Access Network; NG-RAN; F1 application protocol (F1AP) (Release 16)," Technical Specification 38.473, Version 16.0.0, Dec. 2019, 3GPP Organizational Partners, 239 pages.

Author Unknown, "Technical Specification Group Radio Access Network; NG-RAN; F1 data transport (Release 15)," Technical Specification 38.474, Version 15.2.0, Sep. 2018, 3GPP Organizational Partners, 8 pages.

Author Unknown, "Technical Specification Group Radio Access Network; NG Radio Access Network (NG-RAN); F1 interface user plane protocol (Release 15)," Technical Specification 38.475, Version 0.3.0, Oct. 2017, 3GPP Organizational Partners, 16 pages.

Chairman, et al., "FG IMT-2020: Report on Standards Gap Analysis," Study Group 13, TD 208, Feb. 24, 2016, International Telecommunication Union, 172 pages.

Cheng, et al., "Securing Robust Header Compression (ROHC)," IEEE Military Communications Conference, 2013, EEE Computer Society, pp. 1383-1390.

Rescorla, et al., "The Transport Layer Security (TLS) Protocol Version 1.3," Request for Comments 8446, Aug. 2018, Internet Engineering Task Force, 160 pages.

Tuexen, et al., "Datagram Transport Layer Security (DTLS) for Stream Control Transmission Protocol (SCTP)," Request for Comments 6083, Jan. 2011, Internet Engineering Task Force, 9 pages.

First Office Action for Chinese Patent Application No. 202080098595.2, mailed Apr. 9, 2025, 20 pages.

* cited by examiner

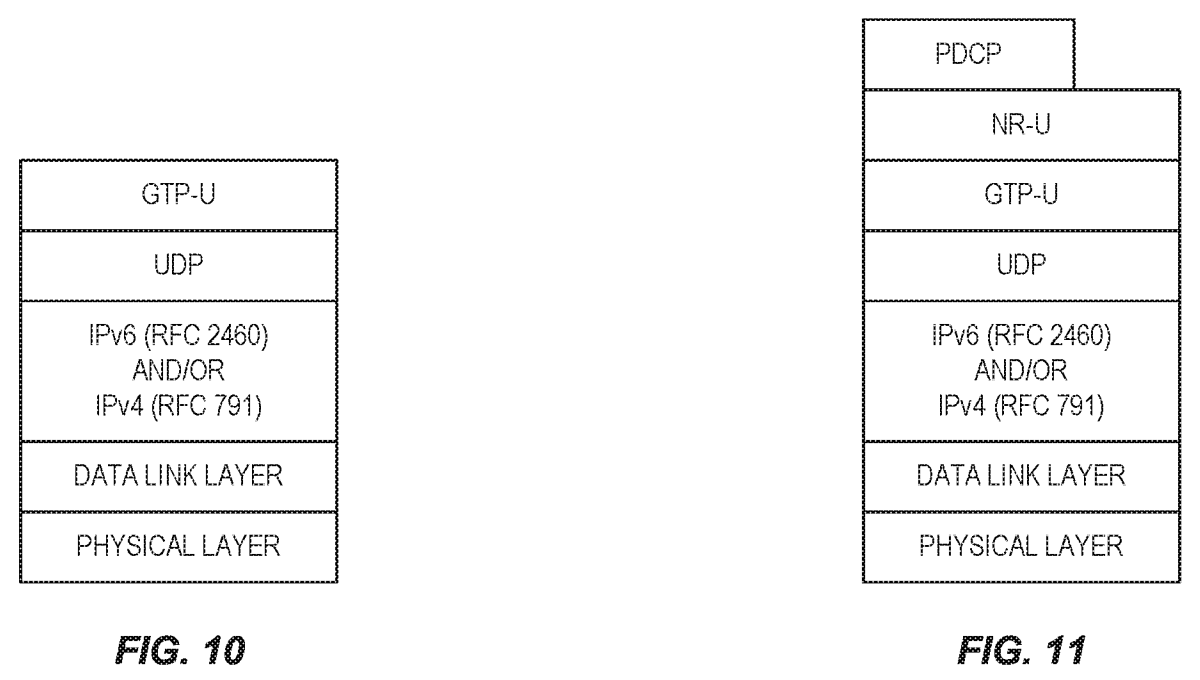

PDCP

NR-U

GTP-U

UDP

IPv6 (RFC 2460)
AND/OR
IPv4 (RFC 791)

DATA LINK LAYER

PHYSICAL LAYER

*FIG. 11*

GTP-U

UDP

IPv6 (RFC 2460)
AND/OR
IPv4 (RFC 791)

DATA LINK LAYER

PHYSICAL LAYER

SELECTIVE USER PLANE PROTECTION IN 5G VIRTUAL RAN

This application is a 35 U.S.C. § 371 national phase filing of International Application No. PCT/IB2020/052482, filed Mar. 18, 2020, the disclosure of which is incorporated herein by reference in its entirety.

TECHNICAL FIELD

The current disclosure relates to virtual Radio Access Network (RAN) nodes.

BACKGROUND

There is a desire to establish viable solutions to guarantee ubiquitous connectivity among devices from all types of environments. Resource optimization and efficiency, extensibility and scalability, and cost efficiency must be taken into account. A widespread design component and a current trend also for a Fifth Generation (5G) telecommunications network are virtualizing and cloudifying both that Radio Access Network (RAN) and Core Network components to adapt to a wide range of requirements from all types of stakeholders, e.g., mobile operators. Variants of these products are packages of Virtual Network Functions (VNFs) to deliver the same functionality as for the Physical Network Functions (PNFs). Operators' strategies for Reduction of Operating Expenses (OPEX) and/or Capital Expenditures (CAPEX) include either bringing own data centers or leasing cloud resources onto which RAN or Core Network VNFs can be deployed.

Virtual RAN (vRAN) variants deployable on Cloud platforms have already gained a lot of momentum. A key feature in any vRAN package is the security component to ensure a high level of assurance for any mobile operator which deploys vRAN on either own or third-party cloud infrastructures. Although the Third Generation Partnership Project (3GPP) establishes a set of security requirements for 5G telecommunications networks, additional security solutions are sometimes necessary to cope with the new threat models specific to every infrastructure. As such, improved systems and methods for protection in 5G vRAN are needed.

SUMMARY

Systems and methods for selective User Plane protection in a Fifth Generation (5G) virtual Radio Access Network (RAN) are provided. In some embodiments, a method performed by a gNB Central Unit (gNB-CU) for communicating with a gNB-Distributed Unit (gNB-DU) includes determining whether to selectively encrypt a Protocol Data Unit (PDU) to be sent to the gNB-DU if the PDU is not otherwise encrypted. In response to determining to selectively encrypt the PDU to be sent to the gNB-DU, the method includes encrypting the PDU to be sent to the gNB-DU. In response to determining to not selectively encrypt the PDU to be sent to the gNB-DU, the method includes passing the PDU to be sent to the gNB-DU. The method also includes transmitting the PDU to be sent to the gNB-DU. In this way, additional security is provided while performance impact is minimized. In some embodiments, this provides a lower overhead on the gNB-CU-User Plane (gNB-CU-UP) side compared to applying a generic protection of all PDUs. Additionally, the latency overhead is limited since a secure session establishment and handshake is confined to the gNB-CU-UP-SEG domain instead of gNB-CU-UP to gNB-DU.

In some embodiments, transmitting the PDU to be sent to the gNB-DU comprises: transmitting the PDU to an Internet Protocol Security (IPsec) Security Gateway (SEG) for transmission to the gNB-DU.

In some embodiments, the gNB-CU comprises a first multiplexer (MUX), and transmitting the PDU to the IPsec SEG comprises transmitting the PDU from the first MUX to a second MUX in the IPsec SEG.

In some embodiments, determining whether to selectively encrypt the PDU to be sent to the gNB-DU comprises determining to selectively encrypt the PDU if one or more of the group consisting of: the PDU comprises "type=0" and "User data existence flag=0"; and the PDU comprises: "type=0"; "User data existence flag=1"; and the PDU is a Packet Data Convergence Protocol (PDCP) Control PDU.

In some embodiments, the method further includes determining whether a PDU received from the gNB-DU was selectively encrypted. In response to determining the received PDU was selectively encrypted, decrypting the received PDU to be sent to the gNB-CU.

In some embodiments, the received PDU is received from the IPsec SEG.

In some embodiments, receiving the received PDU from the IPsec SEG comprises receiving the received PDU by the first MUX from the second MUX in the IPsec SEG.

In some embodiments, a secure session is established between the gNB-CU and the IPsec SEG. In some embodiments, the secure session between the gNB-CU and the IPsec SEG is established when one of the group consisting of: a first PDCP instance created in the gNB-CU; on demand; upon signaling from the gNB-CU; upon setting up an interface between a gNB-CU User Plane (gNB-CU-UP) and a gNB-CU Control Plane (gNB-CU-CP), E1; upon setting up an interface between the gNB-CU and the gNB-DU, F1; and at creation of the gNB-CU-UP.

In some embodiments, encrypting the PDU to be sent to the gNB-DU comprises encrypting the PDU using a symmetric encryption key.

In some embodiments, encrypting the PDU uses a first encryption key and decrypting the received PDU uses a second encryption key where the first encryption key is different than the second encryption key.

In some embodiments, the gNB-CU operates in a first container. In some embodiments, the first MUX operates in the first container. In some embodiments, the first MUX operates in a second container and the first container and the second container operate in a same Pod.

In some embodiments, a method performed by an IPsec SEG for facilitating communication between a gNB-DU and a gNB-CU includes determining whether to selectively encrypt a PDU to be sent to the gNB-CU from the gNB-DU if the PDU is not otherwise encrypted. In response to determining to selectively encrypt the PDU to be sent to the gNB-CU, the method includes encrypting the PDU to be sent to the gNB-CU. In response to determining to not selectively encrypt the PDU to be sent to the gNB-CU, the method includes passing the PDU to be sent to the gNB-CU. The method also includes transmitting the PDU to the gNB-CU.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 10 illustrates an F1-U transport layer, according to some embodiments of the present disclosure;

FIG. 11 illustrates a gNB-CU-User Plane (gNB-CU-UP) protocol stack implementing PDCP and F1-U termination, according to some embodiments of the present disclosure;

DETAILED DESCRIPTION

Figure 1:
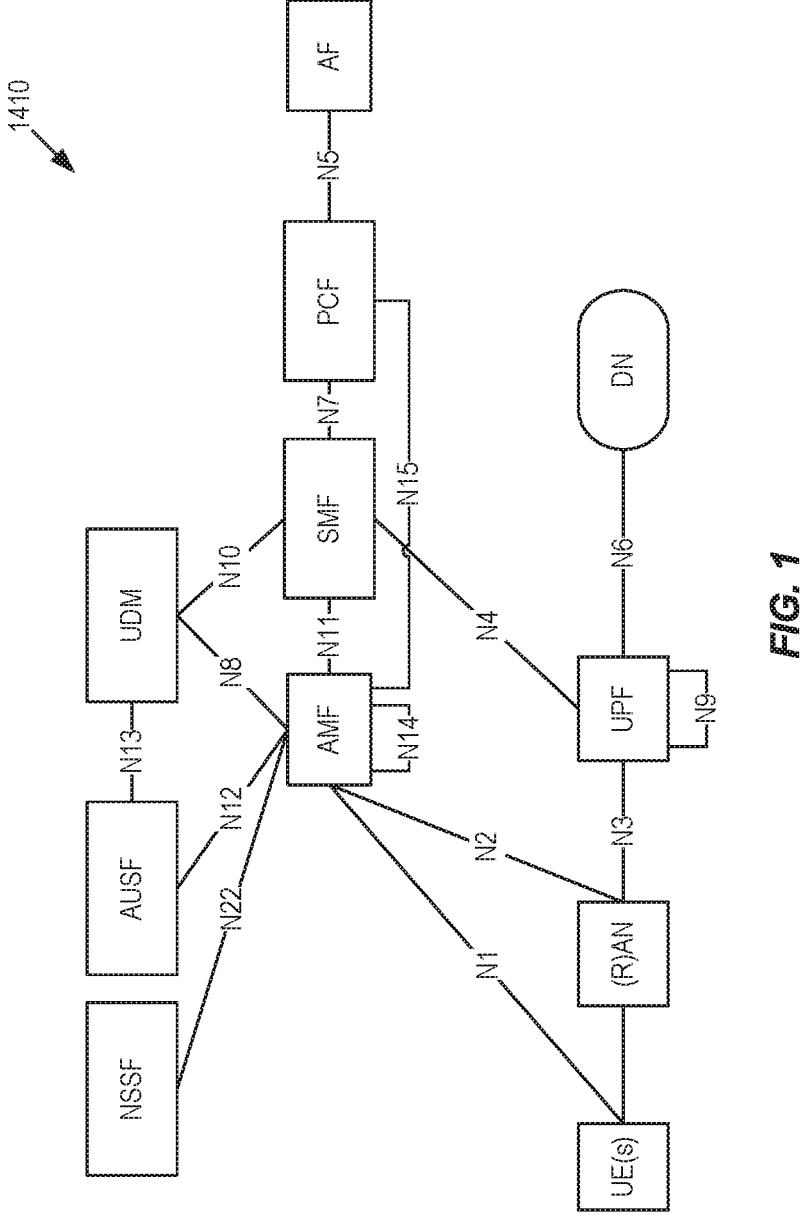
FIG. 1 illustrates a wireless communication system represented as a 5G network architecture composed of core Network Functions (NFs), where interaction between any two NFs is represented by a point-to-point reference point/ interface.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Virtual RAN (vRAN) variants deployable on Cloud platforms have already gained a lot of momentum. A key feature in any vRAN package is the security component to ensure a high level of assurance for any mobile operator which deploys vRAN on either own or third-party cloud infrastructures. Although 3GPP establishes a set of security requirements for 5G telecommunications networks, including requirements for the newly introduced interfaces in the 5G gNB split architecture, additional security solutions are sometimes necessary to cope with the new threat models specific to every infrastructure.

Indeed, the new cloud paradigm impacts the legacy threat models established for PNFs. In addition to malicious end-users, the threat model for virtualized environments includes two new types of threat agents: (1) tenants collocated in the same physical infrastructure; and (2) the cloud provider itself, which may be different from the operator (e.g., a public cloud provider). Some operators do not fully trust the virtual environment to such a point that they desire all communications be protected even within the datacenter. Thus, additional security mechanisms are sometimes required to accompany the vRAN VNFs deployment on a cloud. It is desirable for any security solution to minimally impact the functionality and performances at operational level. As such, improved systems and methods for protection in 5G vRAN are needed.

The vRAN architecture is described in relation to 3GPP (TS 38.401) followed by a high-level view of the common security architecture in case vRAN is deployed over Third Party Platform (3PP) cloud platforms.

FIG. 1 illustrates a wireless communication system represented as a 5G network architecture composed of core Network Functions (NFs), where interaction between any two NFs is represented by a point-to-point reference point/ interface. FIG. 1 can be viewed as one particular implementation of the system 1400 of FIG. 14.

Seen from the access side the 5G network architecture shown in FIG. 1 comprises a plurality of User Equipment (UEs) connected to either a RAN or an Access Network (AN) as well as an Access and Mobility Management Function (AMF). Typically, the (R)AN comprises base stations, e.g. such as evolved Node Bs (eNBs) or NR base stations (gNBs) or similar. Seen from the core network side, the 5G core NFs shown in FIG. 1 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 1, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 1. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 2:
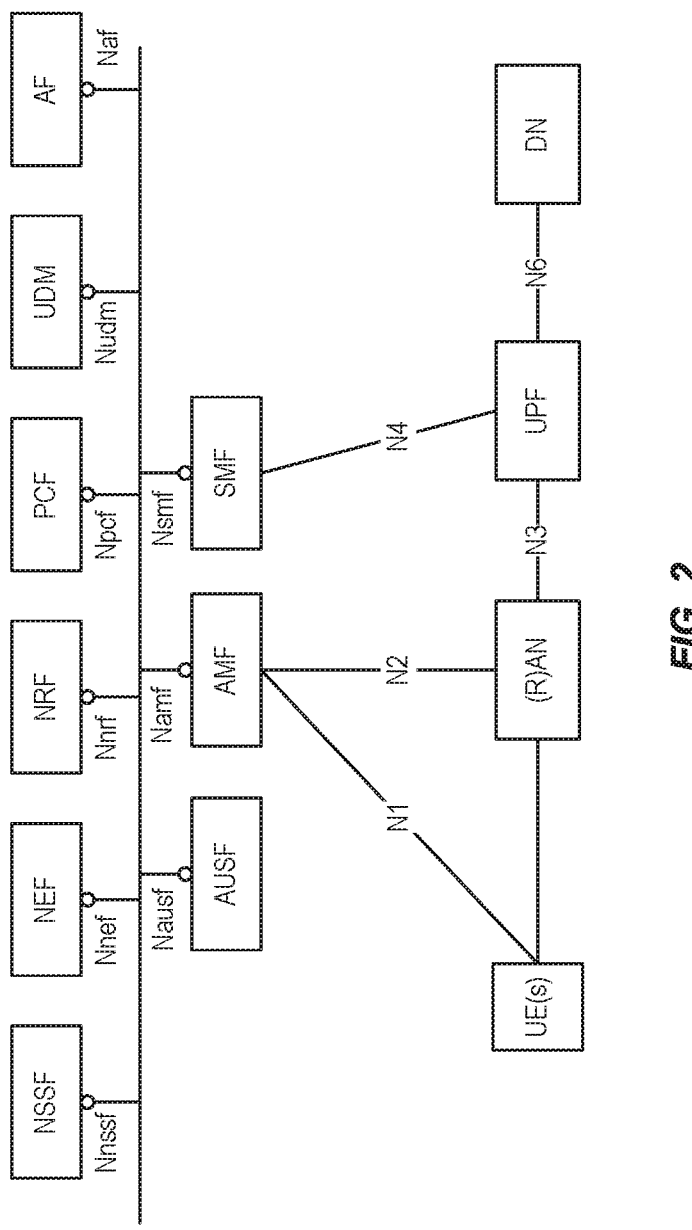
FIG. 2 illustrates a 5G network architecture using service-based interfaces between the NFs in the control plane instead of the point-to-point reference points/interfaces used in the 5G network architecture of FIG. 1.

The 5G system architecture defined by 3GPP (TS 23.501) is depicted in FIG. 2. FIG. 2 illustrates a 5G network architecture using service-based interfaces between the NFs in the control plane, instead of the point-to-point reference points/interfaces used in the 5G network architecture of FIG. 1. However, the NFs described above with reference to FIG. 1 correspond to the NFs shown in FIG. 2. The service(s) etc.

that a NF provides to other authorized NFs can be exposed to the authorized NFs through the service-based interface. In FIG. 2, the service-based interfaces are indicated by the letter "N" followed by the name of the NF, e.g. Namf for the service-based interface of the AMF and Nsmf for the service based interface of the SMF etc. The Network Exposure Function (NEF) and the Network Function (NF) Repository Function (NRF) in FIG. 2 are not shown in FIG. 1 discussed above. However, it should be clarified that all NFs depicted in FIG. 1 can interact with the NEF and the NRF of FIG. 2 as necessary, though not explicitly indicated in FIG. 1.

Some properties of the NFs shown in FIGS. 1 and 2 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

In some embodiments of the RAN domain of FIG. 2, the new gNB (TS 38.300) provides a vRAN—a product aiming to: (1) deliver the legacy RAN benefits and, additionally, alleviate the core network signaling (e.g., keep the mobility signaling in RAN); (2) deliver the cloud generic benefits (resource pooling, improved reliability with geo-redundancy), together with reducing capital and operational expenditure (CAPEX/OPEX), enabling multi-tenancy, resiliency, deterministic computing performance, as well as constituting the ground for new business models.

Figure 3:
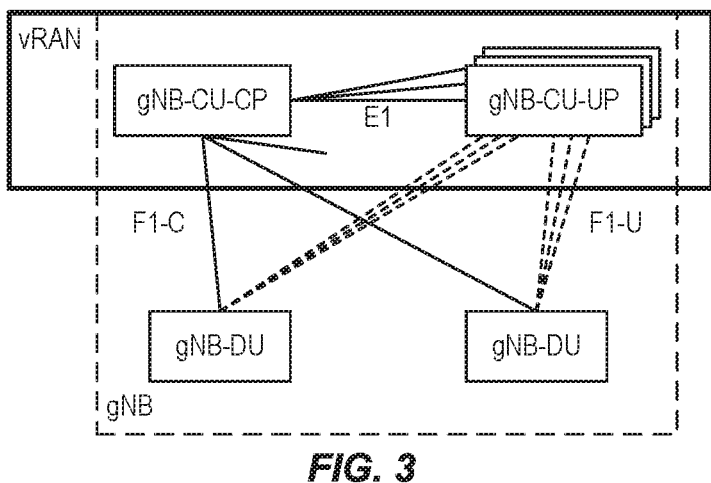
FIG. 3 illustrates a flexible scheme to place the various entities constituting the RAN and enables collaboration between them, according to some embodiments of the present disclosure.

In some embodiments, the vRAN complies with the 3GPP high level architecture in FIG. 3 which illustrates a flexible scheme to place the various entities constituting the RAN and enable collaboration between them. The parts requiring tight synchronization in the protocol stack and stringent latency are closer to the radio environment (closer to the end-user); e.g., the 3GPP gNB-DUs, implementing the PHY/MAC/RLC stack layers (TS 38.401). The parts with radio asynchronous functions (Packet Processing Function (PPF) and Radio Control Function (RCF)), corresponding to 3GPP gNB-CU-User Plane (gNB-CU-UP) and gNB-CU-Control Plane (gNB-CU-CP) respectively) may be virtualized (e.g., in the Central Office); they implement the Packet Data Convergence Protocol (PDCP)/IP and PDCP/RRC stack layers, respectively.

In FIG. 3, there is a pool of gNB-DUs that may connect to a pool of gNB-CUs (gNB-CU-UPs and gNB-CU-CPs) over an IP network. At initiation, a persistent connection is set up between gNB-DUs and gNB-CUs. The different User Equipment (UE) data flows are mapped to Data Radio Bearers (DRBs) within these persistent connections.

F1 is a logical interface connecting the CUs with the DUs. The 3GPP TS 38.401 document specifies that F1 terminates in the gNB-CU and gNB-DU. The F1 functions are detailed in TS 38.470 v.15.5.0 and more precisely Sec. 5.2 for F1-C (interface management, system information, UE context management, RRC message transfer, paging, etc.) and Sec. 5.3 for F1-U (transfer of user-data, i.e., the DRB data, and flow control functions). The protocol stack and the protocol itself (i.e., F1AP) are specified in TS 38.472 and TS 38.473 for F1-C. As to F1-U, TS 38.475 specifies the protocol stack (i.e., F1-U in GTP-U). Finally, the user plane protocol used over the F1-U interface is specified in TS 38.425 ("NR user plane protocol", with the clarification: "NR user plane protocol functions may reside in nodes terminating either the X2-U (for EN-DC) or the Xn-U or the F1-U interface."). As used herein, the terms F1-U and NR-U are used interchangeably.

In TS 38.474 v15.2.0: The transport bearer is identified by the General Packet Radio Service Tunneling Protocol (GTP-U) Tunnel Endpoint ID (TEID) (TS 29.281) and the IP address (source TEID, destination TEID, source IP address, destination IP address). Hence, distribution of bearers can be charted by observing these identifiers.

By the very nature of the information transferred over it, the F1 interface has been dictated specific security requirements in TS 33.501. Both security requirements and security mechanisms concerning F1 (TS 33.501 (v15.4.0)) are reproduced herein.

5.3.9 Requirements for the gNB F1 Interfaces

Requirements given below apply to gNBs with split DU-CU implementations using F1 interface defined in TS 38.470 [31]. Signalling traffic (i.e. both F1-C interface management traffic defined in TS 38.470 [31] and F1-C signalling bearer defined in TS 38.472 [32]) and user plane data can be sent on the F1 interface between a given DU and its CU.

F1-C interface shall support confidentiality, integrity and replay protection.

All management traffic carried over the CU-DU link shall be integrity, confidentiality and replay protected.

The gNB shall support confidentiality, integrity and replay protection on the gNB DU-CU F1-U interface [33] for user plane.

F1-C and management traffic carried over the CU-DU link shall be protected independently from F1-U traffic.

NOTE: The above requirements allow to have F1-U protected differently (including turning integrity and/or encryption off or on for F1-U) from all other traffic on the CU-DU (e.g. the traffic over F1-C).

9.8.2 Security Mechanisms for the F1 Interface

The F1 interface connects the gNB-CU to the gNB-DU. It consists of the F1-C for control plane and the F1-U for the user plane.

In order to protect the traffic on the F1-U interface, IPsec Encapsulating Security Payload (ESP) and IKEv2 certificates-based authentication shall be supported as specified in sub-clause 9.1.2 of the present document with confidentiality, integrity and replay protection. In order to protect the traffic on the F1-C interface, IPsec ESP and IKEv2 certificates-based authentication shall be supported as specified in sub-clause 9.1.2 of the present document with confidentiality, integrity and replay protection.

IPsec is mandatory to implement on the gNB-DU and on the gNB-CU. On the gNB-CU side, a SEG may be used to terminate the IPsec tunnel.

In addition to IPsec, for the F1-C interface, Datagram Transport Layer Security (DTLS) shall be supported as specified in RFC 6083 [58] to provide integrity protection, replay protection and confidentiality protection. Security profiles for DTLS implementation and usage shall follow the provisions given in TS 33.310 [5], Annex E.

NOTE 1: The use of transport layer security, via DTLS, does not rule out the use of network layer protection according to Network Domain Security (NDS)/IP as specified in TS 33.210 [3]. In fact, IPsec has the advantage of providing topology hiding.

NOTE 2: The use of cryptographic solutions to protect F1 is an operator's decision. In case the gNB has been placed in a physically secured environment then the 'secure environment' includes other nodes and links beside the gNB.

NOTE 3: The security considerations for DTLS over Steam Control Transmission Protocol (SCTP) are documented in RFC 6083 [58].

From the above, F1-C could benefit from double protection (DTLS and IPsec), whereas F1-U may have the encryption turned off. The reason for the latter is straightforward: F1-U PDUs carry PDCP PDUs which are protected by PDCP (TS 38.323) ciphering. Nonetheless, IPsec remains a common solution for F1-U as well, especially given that IPsec in tunnel mode provides network topology hiding. Furthermore, an IPsec Security Gateway (SEG) service is usually employed for the CU site, i.e., the vRAN domain (see, FIG. 3).

In some embodiments, vRAN is developed as a package of VNFs to be delivered and deployed in a multitenant environment. More precisely, the vRAN Central Units (the gNB-CUs functions, i.e., gNB-CU-UPs and gNB-CU-CPs) are delivered as Virtual Machines and/or Containers. In some embodiments, this results in a Containerized vRAN.

Figure 4:
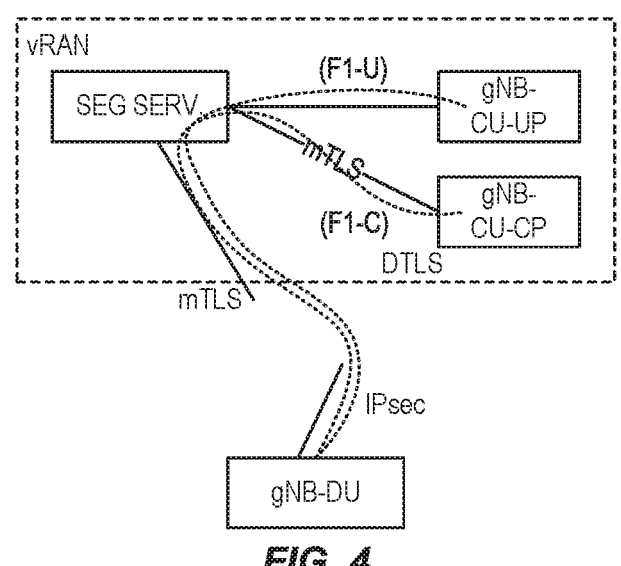
FIG. 4 illustrates a security architecture for F1, according to some embodiments of the present disclosure.

FIG. 4 illustrates a security architecture for F1, according to some embodiments of the present disclosure. F1 commonly relies on the following protection in vRAN deployments:

For F1-C: In FIG. 4, a DTLS session is established for the F1-C interface between CU-CP and DU (e.g., to protect the Signaling Radio Bearers, DU management, etc.). Furthermore, all F1-C is encapsulated in an IPsec tunnel from the vRAN SEG to the DU site. The benefits of employing an IPsec SEG are: (1) the SEG provides network topology hiding; (2) in addition, at CU VNF scale-out, the IPsec tunnel is not multiplicated, hence, IPsec management remains relatively simple. In contrast, an IPsec tunnel ending in CU-CP service (e.g., a container Pod) would result in adding a new IPsec tunnel within the DU site at every new CU-CP service instance. As used herein, a "Pod" refers to a set of containers which can operate as if they are in the same execution environment. In some embodiments, the containers in a Pod can be managed as a=unit. In some embodiments, one or more of the containers in a Pod are dedicated to act as proxy, or as any other "helper" for the virtual function encapsulated in this Pod. In some embodiments, the containers in a Pod share storage and/or network resources. In some embodiments, the containers in a Pod are co-located, co-scheduled, and/or run in a shared context. In some embodiments, the containers in a Pod can be treated as if they are executed on the same physical or virtual machine. An example container infrastructure management is Kubernetes™ which uses the term "Pod" which is the smallest manageable unit of containers. However, the current disclosure is not limited thereto.

For F1-U: The F1-U PDUs over GTP-U/UDP/IP are encapsulated in the IPsec tunnel between SEG and DU. On the SEG-gNB-CU-UP network segment, encryption is turned-off. The reason is because F1-U PDUs are mainly PDCP Data PDUs in Data Radio Bearers (DRBs), which are PDCP protected through ciphering.

Given the numerous advantages of container technologies, it is expected that operators favor containerized vRAN deployments. These vRAN deployments will likely happen in many types of environments, including untrusted, semi-trusted, and/or multitenant environments. As such, the gNB-CU-UP domain is contained in a perimeter guarded with an IPsec SEG.

DRB traffic can be identified by GTP-U TEID and IP addresses of the GTP-U tunnel (TS 38.474). Each NR user plane protocol instance is associated to one data radio bearer only. There is one NR user plane instance per GTP tunnel. When a GTP tunnel is set up, a new NR user plane instance is set up (see, TS 38.425). From TS 38.323 (PDCP specification): "each radio bearer (except for SRB0) is associated with one PDCP entity". That is why, in a multi-tenant environment, an IPsec SEG is suitable: hiding the GTP/IP headers so that IPsec packets do not give meaningful information to an external observer, i.e., the latter cannot distinguish nor map DRB to IP packets.

However, not all F1-U PDUs are PDCP protected. There are several types of F1-U PDUs which carry data different from user PDCP Data PDUs, in downlink or uplink. For example, in TS 38.323 Sec 4.3.2, PDCP in CU (gNB-CU-UP) expects the following service from Radio Link Control (RLC) entities (in gNB-DU): "acknowledged data transfer service, including indication of successful delivery of PDCP PDUs". The TS 38.322 Sec 4.3.1 and 5.2.3.1.1 confirms these RLC to PDCP indications, for DRBs in AM mode (as a result of RLC Status PDU from the UE, the RLC entity shall "send an indication to the upper layers of successful delivery of the RLC Service Data Unit"). These RLC-to-PDCP "indications" are not specifically protected.

Figure 5:
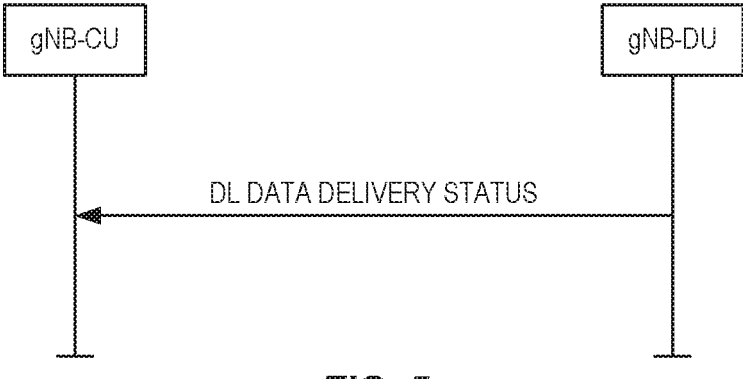
FIG. 5 illustrates a gNB-Distributed Unit (gNB-DU) sending a Downlink (DL) Data Delivery Status to a gNB Central Unit (gNB-CU), according to some embodiments of the present disclosure.

As another example, TS 38.425 defines the NR-U protocol with several NR PDU types, an example being "Downlink Data Delivery Status" [DL DATA DELIVERY STATUS], from the "corresponding node" (a node interacting with a node hosting NR PDCP for flow control) to the "node hosting the NR PDCP entity", i.e., from gNB-DU to gNB-CU as shown in FIG. 5. With respect to FIG. 5, DL Data Delivery Status may be piggybacked on "uplink user data for the concerned data radio bearer" (TS 38.425 Sec 5.4.2.1).

As another example, other types of non-PDCP protected data are also the PDCP Control PDUs from the UE PDCP entity to the CU (gNB-CU-UP) PDCP entity (TS 38.323).

Furthermore, some insights into the UE behavior seem to be possible to obtain just by observing the DL DATA DELIVERY STATUS F1-U PDU. From TS 38.425: "As soon as the corresponding node detects the successful Random Access Channel (RACH) access by the UE for the corresponding data radio bearer(s), the corresponding node shall send initial DL DATA DELIVERY STATUS frame to the node(s) hosting the NR PDCP entity(ies)." In other words, the DU detecting successful UE RACH access sends this F1-U PDU.

Also from TS 38.425: "The DL DATA DELIVERY STATUS frame shall also include a final frame indication when this frame is the last DL status report. When receiving such indication, the node hosting the NR PDCP entity considers that no more UL or DL data is expected to be transmitted between the corresponding node and the UE." In other words, such F1-U PDU may indicate termination of data for the UE on that DRB.

Furthermore, in B. Cheng and S. Moore, "Securing Robust Header Compression (ROHC)," MILCOM 2013-2013 IEEE Military Communications Conference, San Diego, CA, 2013, pp. 1383-1390, the authors prove three (3) attacks on ROHC, exploiting the ROHC feedback. In TS 38.323 v15.5.0 (PDCP), only ROHC compression is said to be supported. Hence, PDCP Control PDUs with ROHC feedback could benefit from extra protection.

Recall that cloud threat models include the other tenants and/or the cloud provider among threat agents. Thus, just relying upon the security architecture in FIG. 4 would still allow access to a (privileged) observer/attacker/malicious party on the SEG-gNB-CU-UP network segment, i.e., to network data useful to build insights into UE behavior or characteristics.

A more direct solution would then be either ending the IPsec tunnel in the gNB-CU-UP service instances. The disadvantage would be: (1) multiplication of IPsec tunnels at gNB-CU-UP scale-out; and (2) overhead resulted from encryption/decryption of all F1-U PDUs, including the PDCP protected ones.

Or, another direct solution would be establishing a Transport Layer Security (TLS) session from the DUs to the gNB-CU-UPs as is the case with F1-C. The idea of TLS session for mapping with the control plane data (Broadcast Control Channel (BCCH), Physical Control Channel (PCCH), SRB0 and SRB1), has been discussed.

In addition to the real latency overhead, with the Transport Layer Security (TLS) handshake (from CU to DU), there is the overhead of encrypting all the traffic, including the PDCP protected PDUs. Another disadvantage would be that TLS requires a Transmission Control Protocol, which is not present in F1-U (NR-U) transport stack specification. A DTLS or TLS session, be it separate or unique for all DRBs between the gNB-CU-UP and DU, would imply important modifications of the gNB-CU-UP and DU stacks and implementations, which is not attractive for manufacturers.

Overall, these solutions would significantly impact performance on the F1-U interface, including performance of the gNB-CU-UP. As such, improved systems and methods for protection in 5G vRAN are needed.

Figure 6:
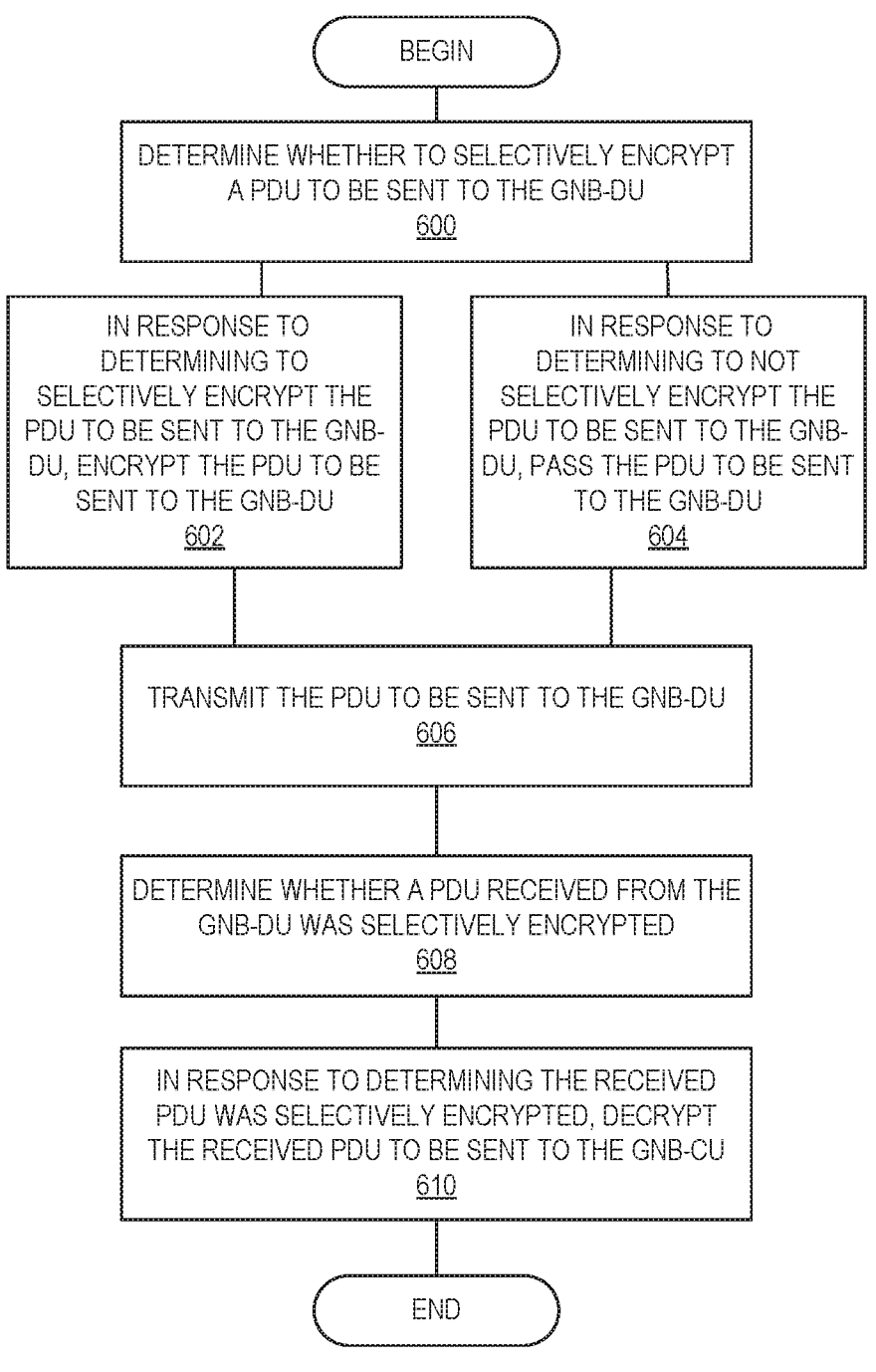
FIG. 6 illustrates a method performed by a gNB-CU for communicating with a gNB-DU, according to some embodiments of the present disclosure.

Systems and methods for selective User Plane protection in a Fifth Generation (5G) virtual Radio Access Network (RAN) are provided. FIG. 6 illustrates a method performed by a gNB Central Unit (gNB-CU) for communicating with a gNB-Distributed Unit (gNB-DU). The method includes determining whether to selectively encrypt a Protocol Data Unit (PDU) to be sent to the gNB-DU if the PDU is not otherwise encrypted (step 600). In response to determining to selectively encrypt the PDU to be sent to the gNB-DU, the method includes encrypting the PDU to be sent to the gNB-DU (step 602). In response to determining to not selectively encrypt the PDU to be sent to the gNB-DU, the method includes passing the PDU to be sent to the gNB-DU (step 604). The method also includes transmitting the PDU to be sent to the gNB-DU (step 606). In this way, additional security is provided while performance impact is minimized. In some embodiments, this provides a lower overhead on the gNB-CU-UP side compared to applying a generic protection of all PDUs. Additionally, the latency overhead is limited since a secure session establishment and handshake is confined to the gNB-CU-UP-SEG domain instead of gNB-CU-UP to gNB-DU. In some embodiments, the gNB-CU optionally determines whether a PDU received from the gNB-DU was selectively encrypted (step 608). In response to determining the received PDU was selectively encrypted, the gNB-CU decrypts the received PDU to be sent to the gNB-CU (step 610).

Figure 7:
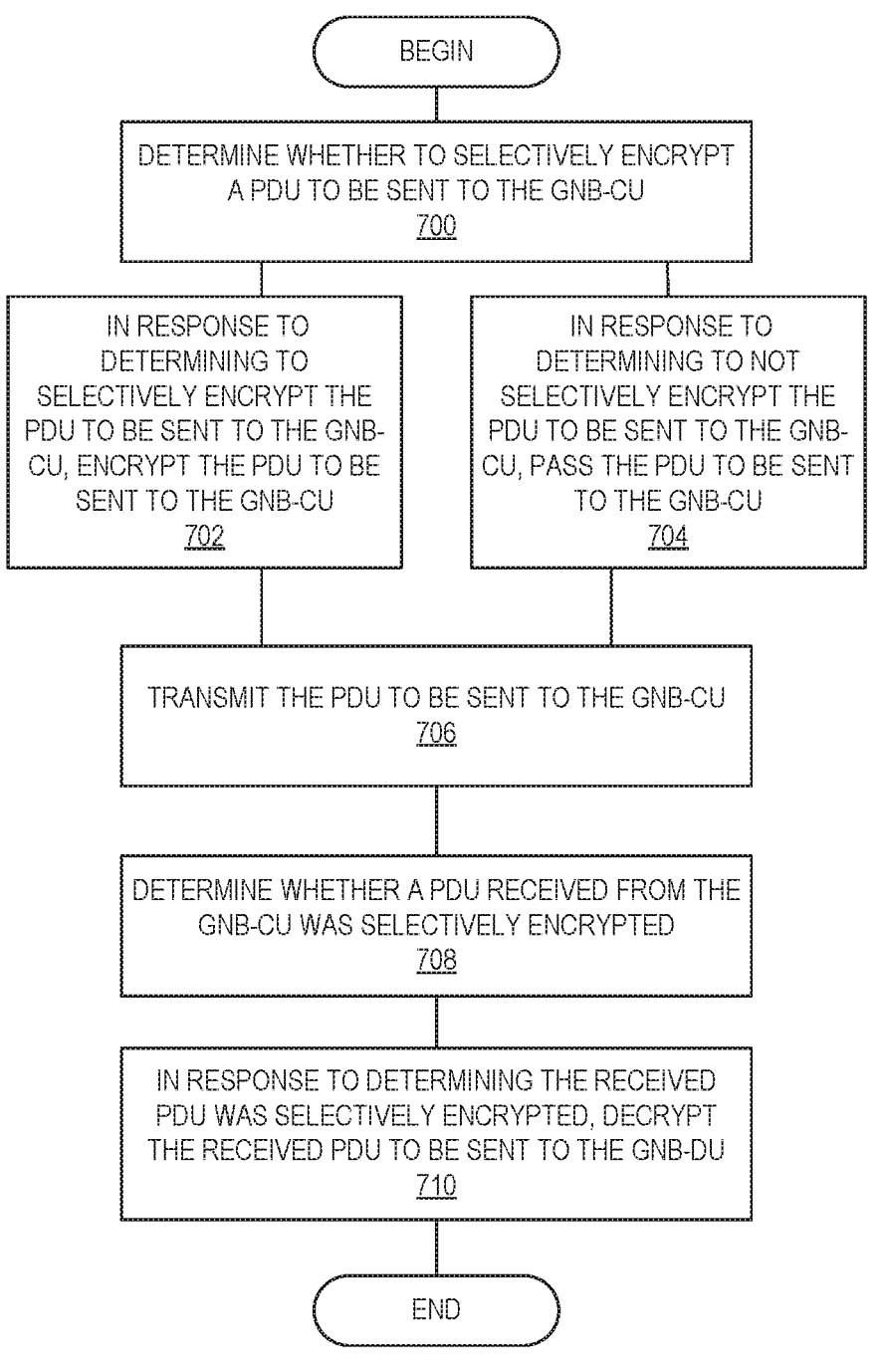
FIG. 7 illustrates a method performed by an Internet Protocol Security (IPsec) Security Gateway (SEG) for facilitating communication between a gNB-DU and a gNB-CU, according to some embodiments of the present disclosure.

FIG. 7 illustrates a method performed by an Internet Protocol Security (IPsec) Security Gateway (SEG) for facilitating communication between a gNB-Distributed Unit (gNB-DU) and a gNB Central Unit (gNB-CU). The method includes determining whether to selectively encrypt a Protocol Data Unit (PDU) to be sent to the gNB-CU from the gNB-DU if the PDU is not otherwise encrypted (step 700). In response to determining to selectively encrypt the PDU to be sent to the gNB-CU, the method includes encrypting the PDU to be sent to the gNB-CU (step 702). In response to determining to not selectively encrypt the PDU to be sent to the gNB-CU, the method includes passing the PDU to be sent to the gNB-CU (step 704). The method also includes transmitting the PDU to the gNB-CU (step 706). In some embodiments, the IPsec SEG optionally determines whether a PDU received from the gNB-CU was selectively encrypted (step 708). In response to determining the received PDU was selectively encrypted, the IPsec SEG decrypts the received PDU to be sent to the gNB-DU (step 710).

With respect to FIG. 4 and to facilitate understanding of some embodiments of the present disclosure, the gNB-CU-UP and SEG are considered services in separate container Pods. Additional details are discussed in relation to FIG. 8 and FIG. 9 using Datagram Transport Layer Security (DTLS) as an example. In some embodiments, the use of DTLS on the shown network segment does not replace the protocol stack with DTLS. Instead, these embodiments use an encryption scheme and payload format similar to DTLS. In some embodiments, this enables the methods to get rid of the key exchange. For instance, in some embodiments, the crypto materials are assumed to be already shared.

In some embodiments, a Multiplexer (MUX) microservice is instantiated in the gNB-CU-UP Pod to distinguish between the PDCP protected PDUs and the PDUs unprotected by PDCP. This MUX can be seen as a proxy for the gNB-CU-UP service.

In some embodiments, in Downlink (DL), the "to-protect" identified PDUs (i.e., PDUs not protected by PDCP by default) are further protected through encryption, for example, DTLS, by the MUX. In some embodiments, in Uplink (UL), the MUX applies decryption for the PDUs protected by, for example, DTLS.

In some embodiments, a MUX microservice is instantiated in the SEG Pod as well in order to mirror the operations of the gNB-CU-UP MUX. In some embodiments, this SEG MUX represents the other DTLS end-point and in UL, the MUX applies DTLS protection to PDUs unprotected by PDCP. In DL, the MUX decrypts the PDUs encrypted with DTLS by the gNB-CU-UP MUX.

Figure 8:
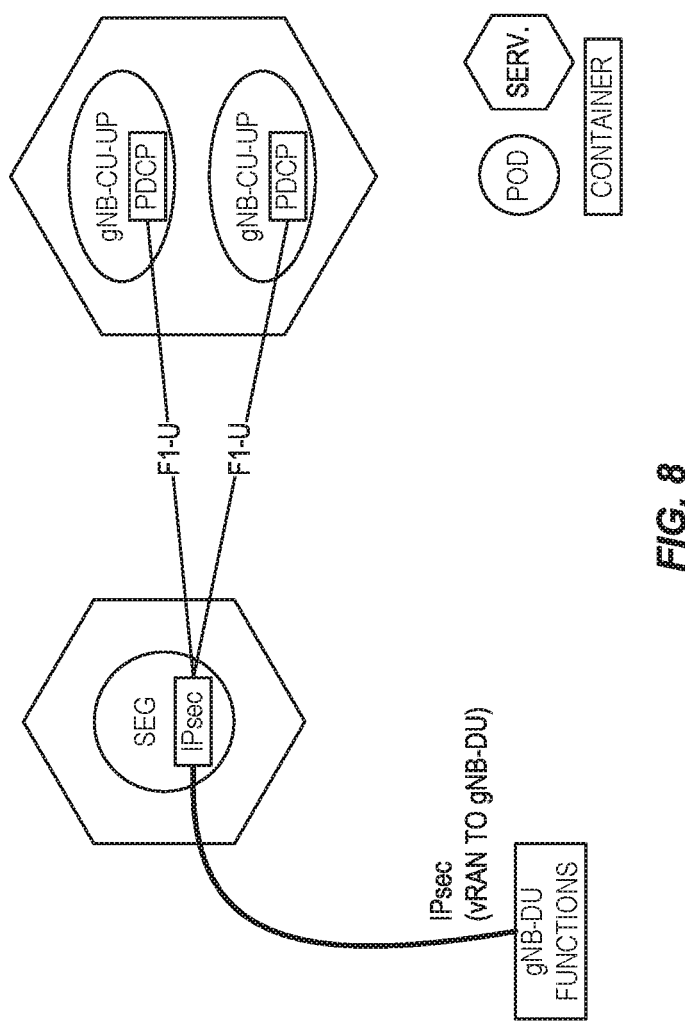
FIGS. 8 and 9 illustrate and extend F1-U to the Packet Data Convergence Protocol (PDCP) entities, according to some embodiments of the present disclosure.
Figure 9:
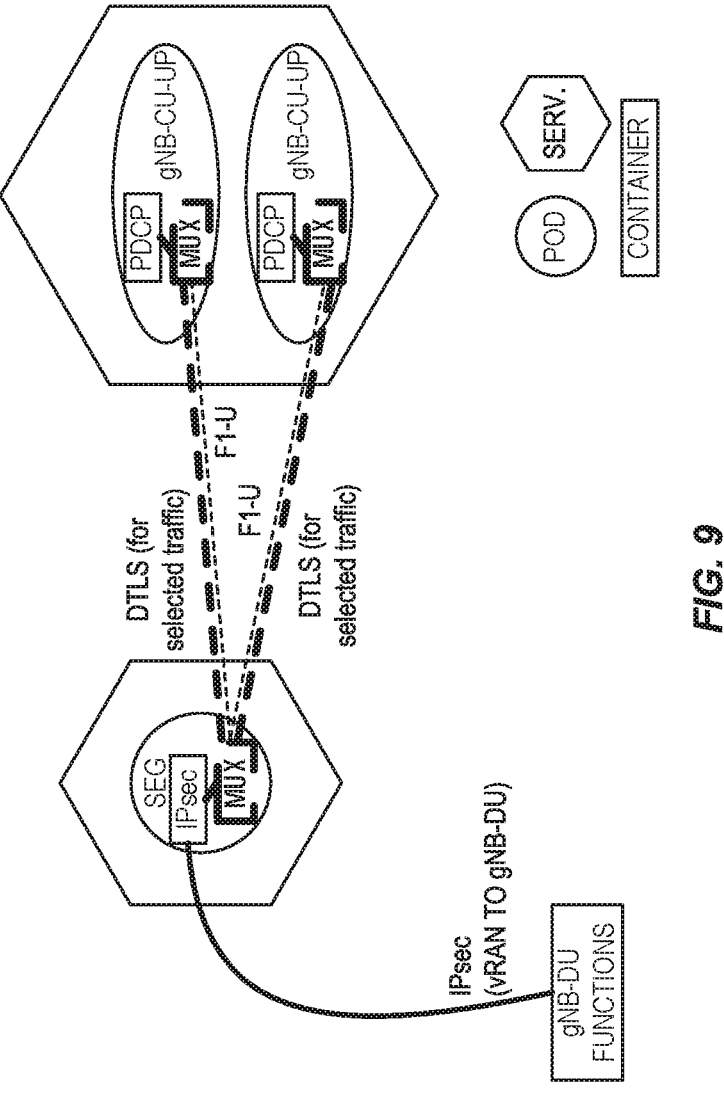

In some embodiments, F1-U (NR-U) does not terminate in the PDCP entities. F1-U terminates in the gNB-CU-UP and gNB-DU. FIGS. 8 and 9 illustrate and extend F1-U to the PDCP entities because the F1-U PDUs (e.g., the NR-U PDUs) mostly carry PDCP Data PDUs. More precisely, there are Downlink/Uplink NR PDCP PDUs. By TS 38.425, for example in Downlink, the NR DL USER DATA frame transports a PDCP PDU (Data or Control) when the "User Data Existence Flag" is set to 1.

In some embodiments, selectively protecting the F1-U PDU payloads which are not PDCP protected on the SEG-gNB-CU-UP network segment has the following advantages:

gNB-CU-UP performance impact is minimized: given that most of the traffic is represented by PDCP Data PDUs, our solution implies a lower overhead on the gNB-CU-UP side compared to applying a generic protection of all PDCP PDUs, with either IPsec or (D)TLS from gNB-CU-UP to gNB-DU; and the latency overhead is limited: secure session establishment and handshake is confined to the gNB-CU-UP-SEG domain instead of gNB-CU-UP to gNB-DU.

Using a DTLS scheme or similar system enables decryption even when PDUs are lost or out of order, i.e., the scheme allows for independent decryption of individual records.

A vRAN common deployment is illustrated in FIG. 4 and FIG. 8. The main drawback with this security setup is related to the fact that only a subset of NR-U PDUs carry PDCP protected payloads (i.e., the NR-U PDCP Data PDUs).

As a non-limiting example, the following NR-U PDUs do not benefit from PDCP protection on the SEG-gNB-CU-UP network segment:

1) The NR-U PDUs with "type=0" AND "User data existence flag=0" (in any direction);
2) The NR-U PDUs with "type=0" AND "User data existence flag=1" AND the PDCP PDU is a PDCP Control PDU, i.e., the D/C bit=0 (i.e., PDCP Control PDUs) (in any direction); and
3) NR-U PDUs with "type=1" or "type=2" (i.e., NR PDU of type DL Data Delivery Status and Assistance Information Data) (from gNB-DU to gNB-CU)

FIG. 10 illustrates the F1-U transport layer (TS 38.474). From the above, on the "radio-side", FIG. 11 illustrates the gNB-CU-UP protocol stack implementing PDCP and F1-U termination.

Some embodiments of the present disclosure focus on the PDCP Control PDUs protection. Some embodiments consider adding a protection (encryption) layer at the gNB-CU-UP side between the PDCP and NR-U layer (see FIG. 11), with a counterpart in the SEG, so that: only the PDCP Control PDUs are protected; and the PDCP Data PDUs are passed-through. In some embodiments, this protection layer is implemented in a so-called Multiplexer (MUX) service in FIG. 9. Its function and operations are detailed below.

In some embodiments, the MUX is a VNF and is implemented as an application to be delivered in the vRAN package. The MUX is eventually instantiated in a container inside the gNB-CU-UP and IPsec SEG Pods (in FIG. 9). In some embodiments, this allows for the establishment of a secure (for instance, DTLS) session between the gNB-CU-UP (client) site and SEG (server) Pods. In some embodiments, this session establishment may be triggered either at the very first PDCP instance created in the gNB-CU-UP, on demand, upon signaling from gNB-CU-CP, at E1 or F1 setup procedure, or right at gNB-CU-UP new instance creation (see below for more details). In some embodiments, when the gnB-CU-UP (FIG. 9) is scaled up, the whole Pod (i.e., the "ovals", including the MUX-es coming with them) are scaled up. In these embodiments, the Pod contains at least one-two containers for the application (e.g., the PDCP container) and a container dedicated for the application-to-outside communication (i.e., the MUX). In some embodiments, when the gNB-CU-CP is scaled up, only PDCP containers are added without adding the corresponding MUX-es.

In some embodiments, this allows for reuse of the exporter value (i.e., similar to https://tools.ietf.org/html/rfc8446 #section-7.5) of this (DTLS) session to derive a symmetric session key(s) for encryption and decryption and use this (these) key(s) in the TRANF-1 and TRANF-2 (described below). In some embodiments, there is a session key per direction, i.e., separate keys for UL and DL.

Additionally, in some embodiments, the MUX acts as a proxy for the traffic between SEG and gNB-CU-UP.

Once the DTLS session is established, the MUX enforces an access control policy which is Authenticated Encryption with Associated Data (AEAD) on PDCP Control PDUs. MUX therefore behaves as a passthrough function for PDCP Data PDUs, which are already PDCP ciphered. The PDCP Data PDU has the D/C bit=1 (see FIG. 12), whereas the Control PDUs have the D/C bit=0.

Figure 13:
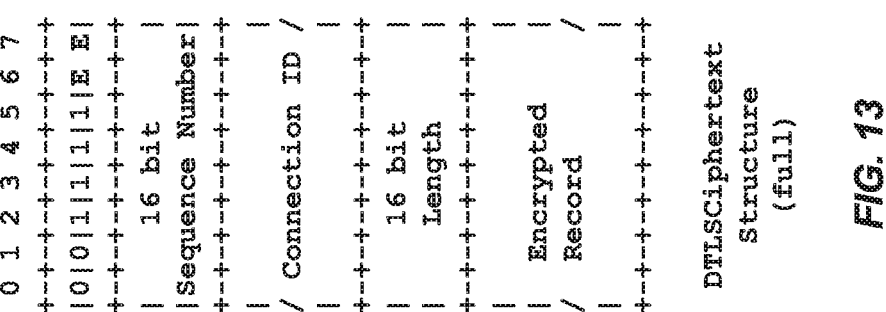
FIG. 13 illustrates a Datagram Transport Layer Security (DTLS) 1.3 ciphertext (header include) structure, according to some embodiments of the present disclosure.
Figure 12:
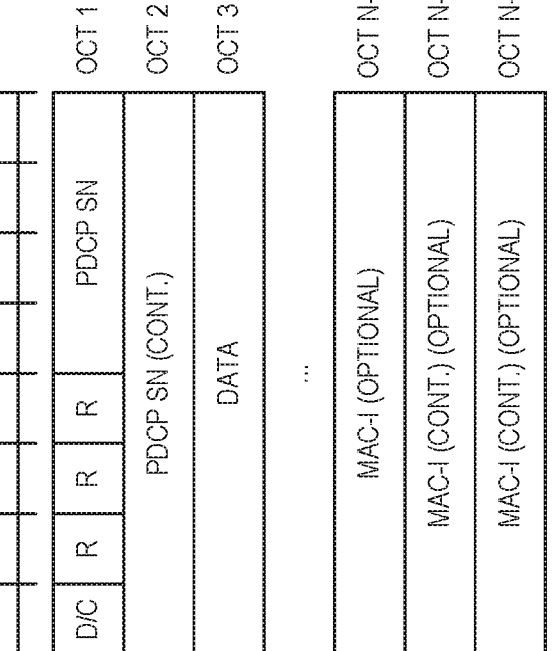
FIG. 12 illustrates a PDCP Control PDU format, according to some embodiments of the present disclosure.

Given this PDCP Control PDU format in FIG. 12 (from TS 38.323 v15.5.0 Section 6.2.3), with D/C bit=0 for Control PDUs, in some embodiments of the present disclosure, a DTLS 1.3 header type is suitable. FIG. 13 illustrates a DTLS 1.3 ciphertext (header include) structure, according to some embodiments of the present disclosure.

The first bit in the DTLS 1.3 header being also set to 0, a main function of MUX includes also the following transformations:

1) TRANSF-1: Transform through encryption a cleartext PDCP Control PDU into a ciphertext formatted to match the DTLS 1.3 format.

TRANSF-2: Transform through decryption a ciphertext expected to be DTLS 1.3-formatted into a cleartext, which would be PDCP PDU Control PDU.

In downlink, the NR-U PDUs proxied by the MUX are subject to either Transformation (1) and/or (2) if/only if the NR-U header contains "type=0" AND "User data existence flag=1" AND the payload (i.e., the user data which is a PDCP PDU) has the first bit set to 0.

It is expected that the MUX proxies the packets formatted as NR-U PDUs. In some embodiments, the operations of the MUX for Downlink data are the following:

At the gNB-CU-UP site: If NR-U PDU has "type=0" AND "User data existence flag=1" AND the payload (the user PDCP PDU) has the first bit set to 0 (i.e., the PDCP PDU is a PDCP Control PDU with D/C bit=0), then: Apply TRANSF-1 and replace the PDCP PDU in the initial NR-U PDU (corresponding to the "user data existence flag") with the resulted ciphertext formatted as shown in FIG. 13. Then Forward the NR-U PDU.

If the PDU does not meet this requirement, Forward the NR-U PDU (passthrough).

At the SEG site: If NR-U PDU has "type=0" AND "User data existence flag=1" AND the first bit of the NR-U payload is set to 0, then: Apply TRANSF-2 to derive the cleartext representing the PDCP PDU with a D/C bit=0 and replace the NR-U payload (corresponding to the "user data existence flag") with the obtained cleartext. Then Forward the NR-U PDU.

If the PDU does not meet this requirement, Forward the NR-U PDU (passthrough).

The operations in Uplink mirror the operations in Downlink. At the SEG site: If NR-U PDU has "type=0" AND "User data existence flag=1" AND the payload (the user PDCP PDU) has the first bit set to 0 (i.e., the PDCP PDU is a PDCP Control PDU with D/C bit=0), then: Apply TRANSF-1 and replace the PDCP PDU in the initial NR-U PDU (corresponding to the "user data existence flag") with the resulted ciphertext formatted as shown in FIG. 13. Then Forward the NR-U PDU.

If the PDU does not meet this requirement, Forward the NR-U PDU (passthrough).

At the gNB-CU-UP site: If NR-U PDU has "type=0" AND "User data existence flag=1" AND the first bit of the NR-U payload is set to 0, then: Apply TRANSF-2 to derive the cleartext representing the PDCP PDU with a D/C bit=0 and replace the NR-U payload (corresponding to the "user data existence flag") with the obtained cleartext. Then Forward the NR-U PDU.

If the PDU does not meet this requirement, Forward the NR-U PDU (passthrough).

As a service pertaining to gNB-CU-UP and SEG operations, MUX instantiation and setup is done prior to any F1-U/NR-U PDU carrying user (UE) data, in some embodiments. The instantiation of the MUX service on gNB-CU-UP and/or SEG sites (e.g., Pods) implies first handshaking the DTLS session for the derivation of the exporter value. The typical setup of the MUX instantiation may be as follows:

1) Reception of a trigger (e.g., gNB-CU-UP instantiation, F1 Setup Procedure, E1 Setup Procedure, etc.);

2) MUX service discovery (between gNB-CU-UP and SEG). One could rely on service registry techniques, dedicated service discovery components, IPv6 mechanisms, etc.;

3) DTLS handshake between the gNB-CU-UP MUX and SEG MUX for the derivation of the exporter value, as input to derive a symmetric session key(s) necessary for TRANSF-1 and TRANSF-2 aforementioned.

Some of the advantages and performance gains that result from embodiments of the present disclosure include one or more of: reusing standard PDU formats; limiting the overhead, both latency (the new operations are eventually only between gNB-CU-UP and SEG) and resources (selectively processing only the NR-U payloads identified with a simple lookup on the same bit); establishing a unique DTLS1.3 session with an exporter used for all DRBs (and not one separate per bearer); ease of implementation (we anticipate that our scheme could be easily adopted or implemented in container technologies like service mesh, where the service mesh proxy could be enhanced with the role of MUX by first parametrizing the header inspection filter).

Figure 14:
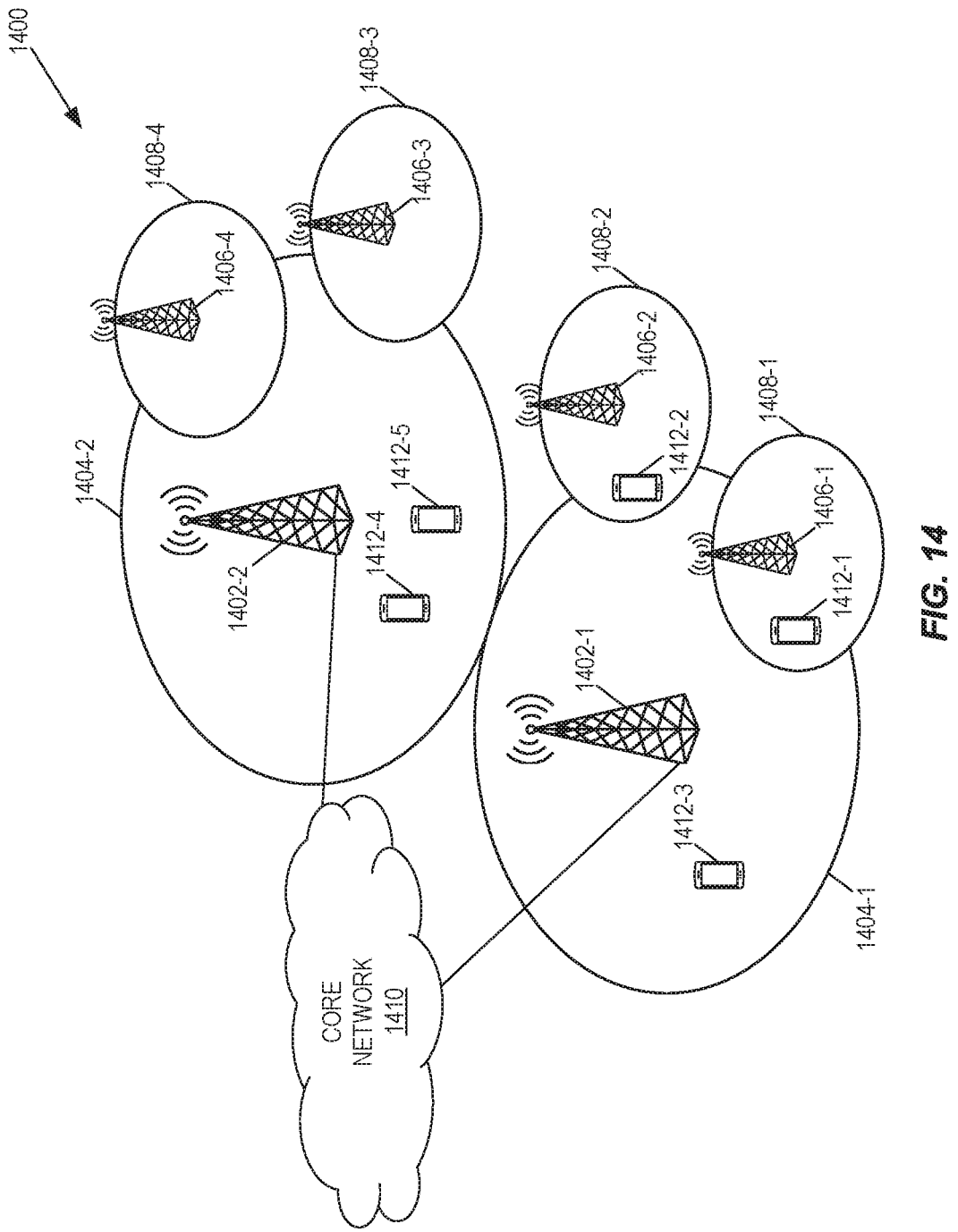
FIG. 14 illustrates one example of a cellular communications network according to some embodiments of the present disclosure.

FIG. 14 illustrates one example of a cellular communications system 1400 in which embodiments of the present disclosure may be implemented. In the embodiments described herein, the cellular communications system 1400 is a 5G system (5GS) including a NR RAN. In this example, the RAN includes base stations 1402-1 and 1402-2, which in 5G NR are referred to as gNBs (e.g., LTE RAN nodes connected to the 5G Core (5GC), which are referred to as gn-eNBs), controlling corresponding (macro) cells 1404-1 and 1404-2. The base stations 1402-1 and 1402-2 are generally referred to herein collectively as base stations 1402 and individually as base station 1402. Likewise, the (macro) cells 1404-1 and 1404-2 are generally referred to herein collectively as (macro) cells 1404 and individually as (macro) cell 1404. The RAN may also include a number of low power nodes 1406-1 through 1406-4 controlling corresponding small cells 1408-1 through 1408-4. The low power nodes 1406-1 through 1406-4 can be small base stations (such as pico or femto base stations) or Remote Radio Heads (RRHs), or the like. Notably, while not illustrated, one or more of the small cells 1408-1 through 1408-4 may alternatively be provided by the base stations 1402. The low power nodes 1406-1 through 1406-4 are generally referred to herein collectively as low power nodes 1406 and individually as low power node 1406. Likewise, the small cells 1408-1 through 1408-4 are generally referred to herein collectively as small cells 1408 and individually as small cell 1408. The cellular communications system 1400 also includes a core network 1410, which in the 5GS is referred to as the 5G core (5GC). The base stations 1402 (and optionally the low power nodes 1406) are connected to the core network 1410.

The base stations 1402 and the low power nodes 1406 provide service to wireless communication devices 1412-1 through 1412-5 in the corresponding cells 1404 and 1408. The wireless communication devices 1412-1 through 1412-5 are generally referred to herein collectively as wireless communication devices 1412 and individually as wireless communication device 1412. In the following description, the wireless communication devices 1412 are oftentimes UEs, but the present disclosure is not limited thereto.

Figure 15:
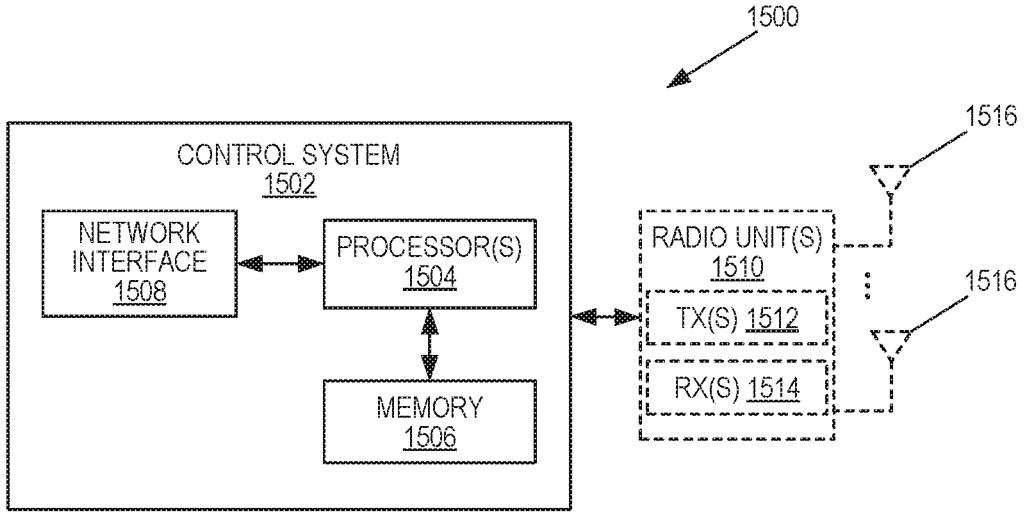
FIG. 15 is a schematic block diagram of a radio access node according to some embodiments of the present disclosure.

FIG. 15 is a schematic block diagram of a radio access node 1500 according to some embodiments of the present disclosure. Optional features are represented by dashed boxes. The radio access node 1500 may be, for example, a base station 1402 or 1406 or a network node that implements all or part of the functionality of the base station 1402 or gNB described herein. As illustrated, the radio access node 1500 includes a control system 1502 that includes one or more processors 1504 (e.g., Central Processing Units (CPUs), Application Specific Integrated Circuits (ASICs), Field Programmable Gate Arrays (FPGAs), and/or the like), memory 1506, and a network interface 1508. The one or more processors 1504 are also referred to herein as processing circuitry. In addition, the radio access node 1500 may include one or more radio units 1510 that each includes one or more transmitters 1512 and one or more receivers 1514 coupled to one or more antennas 1516. The radio units 1510 may be referred to or be part of radio interface circuitry. In some embodiments, the radio unit(s) 1510 is external to the control system 1502 and connected to the control system 1502 via, e.g., a wired connection (e.g., an optical cable). However, in some other embodiments, the radio unit(s) 1510 and potentially the antenna(s) 1516 are integrated together with the control system 1502. The one or more processors 1504 operate to provide one or more functions of a radio access node 1500 as described herein. In some embodiments, the function(s) are implemented in software that is stored, e.g., in the memory 1506 and executed by the one or more processors 1504.

Figure 16:
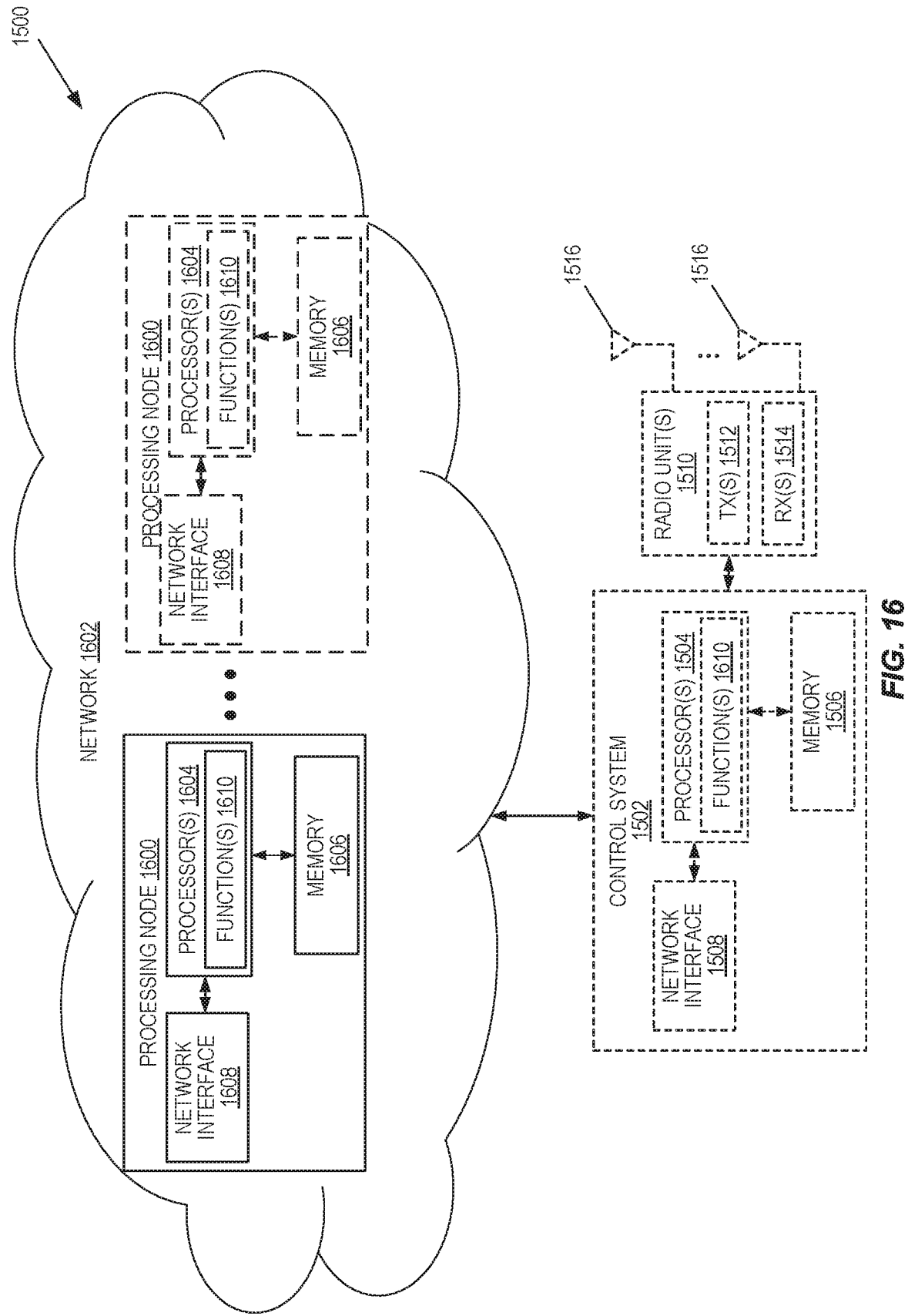
FIG. 16 is a schematic block diagram that illustrates a virtualized embodiment of the radio access node of FIG. 15 according to some embodiments of the present disclosure.

FIG. 16 is a schematic block diagram that illustrates a virtualized embodiment of the radio access node 1500 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1500 in which at least a portion of the functionality of the radio access node 1500 is implemented as a virtual component(s) (e.g., via a virtual machine(s) executing on a physical processing node(s) in a network(s)). As illustrated, in this example, the radio access node 1500 may include the control system 1502 and/or the one or more radio units 1510, as described above. The control system 1502 may be connected to the radio unit(s) 1510 via, for example, an optical cable or the like. The radio access node 1500 includes one or more processing nodes 1600 coupled to or included as part of a network(s) 1602. If present, the control system 1502 or the radio unit(s) are connected to the processing node(s) 1600 via the network 1602. Each processing node 1600 includes one or more processors 1604 (e.g., CPUs, ASICs, FPGAs, and/or the like), memory 1606, and a network interface 1608.

In this example, functions 1610 of the radio access node 1500 described herein are implemented at the one or more processing nodes 1600 or distributed across the one or more processing nodes 1600 and the control system 1502 and/or the radio unit(s) 1510 in any desired manner. In some particular embodiments, some or all of the functions 1610 of the radio access node 1500 described herein are implemented as virtual components executed by one or more virtual machines implemented in a virtual environment(s) hosted by the processing node(s) 1600. As will be appreciated by one of ordinary skill in the art, additional signaling or communication between the processing node(s) 1600 and the control system 1502 is used in order to carry out at least some of the desired functions 1610. Notably, in some embodiments, the control system 1502 may not be included, in which case the radio unit(s) 1510 communicate directly with the processing node(s) 1600 via an appropriate network interface(s).

In some embodiments, a computer program including instructions which, when executed by at least one processor, causes the at least one processor to carry out the functionality of radio access node 1500 or a node (e.g., a processing node 1600) implementing one or more of the functions 1610 of the radio access node 1500 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
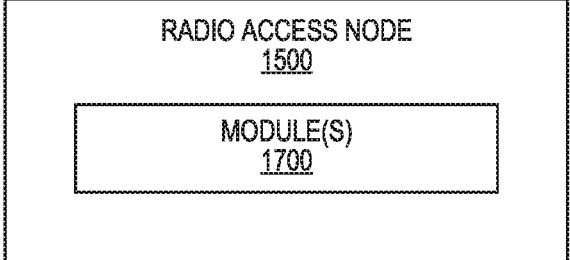
FIG. 17 is a schematic block diagram of the radio access node of FIG. 15 according to some other embodiments of the present disclosure.

FIG. 17 is a schematic block diagram of the radio access node 1500 according to some other embodiments of the present disclosure. The radio access node 1500 includes one or more modules 1700, each of which is implemented in software. The module(s) 1700 provide the functionality of the radio access node 1500 described herein. This discussion is equally applicable to the processing node 1600 of FIG. 16 where the modules 1700 may be implemented at one of the processing nodes 1600 or distributed across multiple processing nodes 1600 and/or distributed across the processing node(s) 1600 and the control system 1502.

Figure 18:
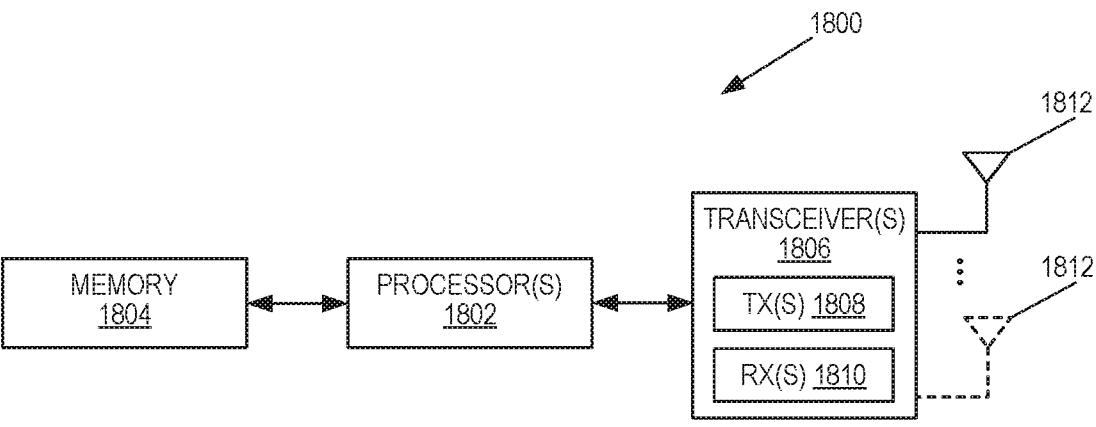
FIG. 18 is a schematic block diagram of a User Equipment device (UE) according to some embodiments of the present disclosure.

FIG. 18 is a schematic block diagram of a wireless communication device 1800 according to some embodiments of the present disclosure. As illustrated, the wireless communication device 1800 includes one or more processors 1802 (e.g., CPUs, ASICs, FPGAs, and/or the like), memory 1804, and one or more transceivers 1806 each including one or more transmitters 1808 and one or more receivers 1810 coupled to one or more antennas 1812. The transceiver(s) 1806 includes radio-front end circuitry connected to the antenna(s) 1812 that is configured to condition signals communicated between the antenna(s) 1812 and the processor(s) 1802, as will be appreciated by on of ordinary skill in the art. The processors 1802 are also referred to herein as processing circuitry. The transceivers 1806 are also referred to herein as radio circuitry. In some embodiments, the functionality of the wireless communication device 1800 described above may be fully or partially implemented in software that is, e.g., stored in the memory 1804 and executed by the processor(s) 1802. Note that the wireless communication device 1800 may include additional components not illustrated in FIG. 18 such as, e.g., one or more user interface components (e.g., an input/output interface including a display, buttons, a touch screen, a microphone, a speaker(s), and/or the like and/or any other components for allowing input of information into the wireless communication device 1800 and/or allowing output of information from the wireless communication device 1800), a power supply (e.g., a battery and associated power circuitry), etc.

In some embodiments, a computer program including instructions which, when executed by at least one processor, causes the at least one processor to carry out the functionality of the wireless communication device 1800 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 19:
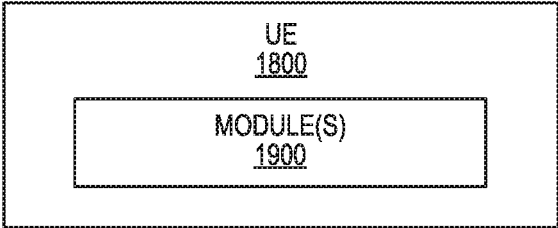
FIG. 19 is a schematic block diagram of the UE of FIG. 18 according to some other embodiments of the present disclosure.

FIG. 19 is a schematic block diagram of the wireless communication device 1800 according to some other embodiments of the present disclosure. The wireless communication device 1800 includes one or more modules 1900, each of which is implemented in software. The module(s) 1900 provide the functionality of the wireless communication device 1800 described herein.

Figure 20:
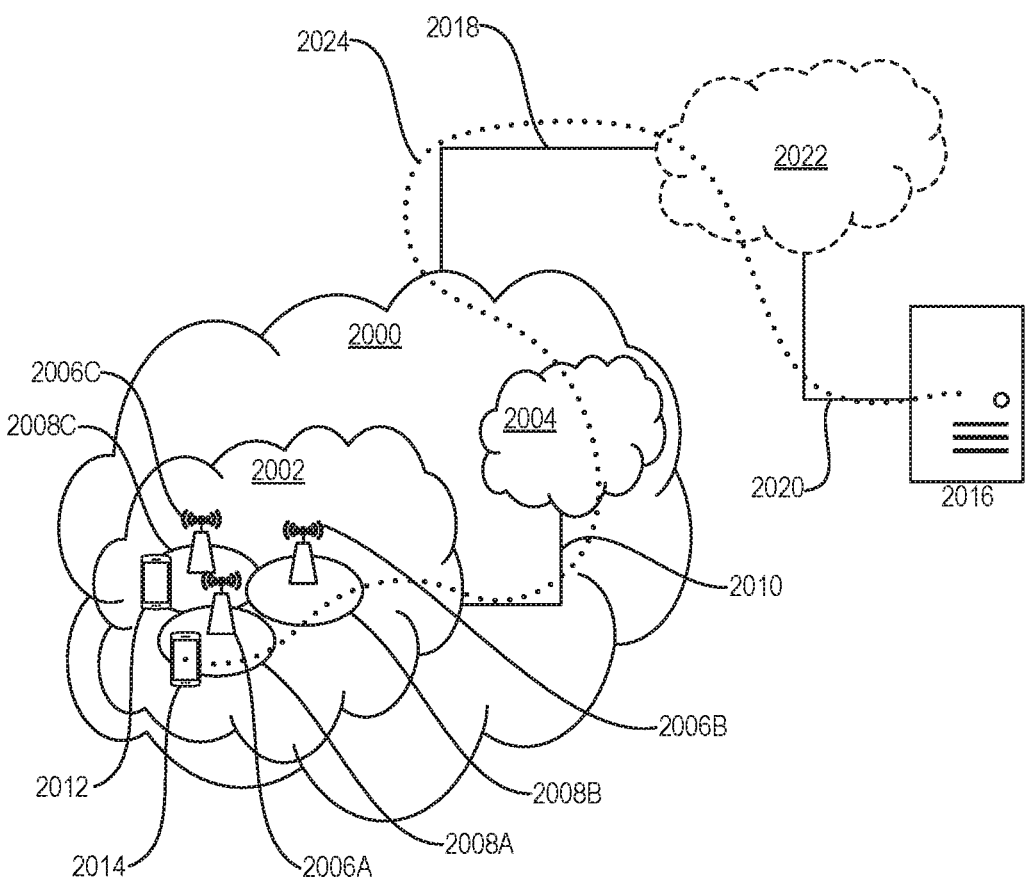
FIG. 20 illustrates a telecommunication network connected via an intermediate network to a host computer in accordance with some embodiments of the present disclosure.

With reference to FIG. 20, in accordance with an embodiment, a communication system includes a telecommunication network 2000, such as a 3GPP-type cellular network, which comprises an access network 2002, such as a RAN, and a core network 2004. The access network 2002 comprises a plurality of base stations 2006A, 2006B, 2006C, such as Node Bs, eNBs, gNBs, or other types of wireless Access Points (APs), each defining a corresponding coverage area 2008A, 2008B, 2008C. Each base station 2006A, 2006B, 2006C is connectable to the core network 2004 over a wired or wireless connection 2010. A first UE 2012 located in coverage area 2008C is configured to wirelessly connect to, or be paged by, the corresponding base station 2006C. A second UE 2014 in coverage area 2008A is wirelessly connectable to the corresponding base station 2006A. While a plurality of UEs 2012, 2014 are illustrated in this example, the disclosed embodiments are equally applicable to a situation where a sole UE is in the coverage area or where a sole UE is connecting to the corresponding base station 2006.

The telecommunication network 2000 is itself connected to a host computer 2016, which may be embodied in the hardware and/or software of a standalone server, a cloud-implemented server, a distributed server, or as processing resources in a server farm. The host computer 2016 may be under the ownership or control of a service provider, or may be operated by the service provider or on behalf of the service provider. Connections 2018 and 2020 between the telecommunication network 2000 and the host computer 2016 may extend directly from the core network 2004 to the host computer 2016 or may go via an optional intermediate network 2022. The intermediate network 2022 may be one of, or a combination of more than one of, a public, private, or hosted network; the intermediate network 2022, if any, may be a backbone network or the Internet; in particular, the intermediate network 2022 may comprise two or more sub-networks (not shown).

The communication system of FIG. 20 as a whole enables connectivity between the connected UEs 2012, 2014 and the host computer 2016. The connectivity may be described as an Over-the-Top (OTT) connection 2024. The host computer 2016 and the connected UEs 2012, 2014 are configured to communicate data and/or signaling via the OTT connection 2024, using the access network 2002, the core network 2004, any intermediate network 2022, and possible further infrastructure (not shown) as intermediaries. The OTT connection 2024 may be transparent in the sense that the participating communication devices through which the OTT connection 2024 passes are unaware of routing of uplink and downlink communications. For example, the base station 2006 may not or need not be informed about the past routing of an incoming downlink communication with data originating from the host computer 2016 to be forwarded (e.g., handed over) to a connected UE 2012. Similarly, the base station 2006 need not be aware of the future routing of an outgoing uplink communication originating from the UE 2012 towards the host computer 2016.

Example implementations, in accordance with an embodiment, of the UE, base station, and host computer discussed in the preceding paragraphs will now be described with reference to FIG. 21. In a communication system 2100, a host computer 2102 comprises hardware 2104 including a communication interface 2106 configured to set up and maintain a wired or wireless connection with an interface of a different communication device of the communication system 2100. The host computer 2102 further comprises processing circuitry 2108, which may have storage and/or processing capabilities. In particular, the processing circuitry 2108 may comprise one or more programmable processors, ASICs, FPGAs, or combinations of these (not shown) adapted to execute instructions. The host computer 2102 further comprises software 2110, which is stored in or accessible by the host computer 2102 and executable by the processing circuitry 2108. The software 2110 includes a host application 2112. The host application 2112 may be operable to provide a service to a remote user, such as a UE 2114 connecting via an OTT connection 2116 terminating at the UE 2114 and the host computer 2102. In providing the service to the remote user, the host application 2112 may provide user data which is transmitted using the OTT connection 2116.

The communication system 2100 further includes a base station 2118 provided in a telecommunication system and comprising hardware 2120 enabling it to communicate with the host computer 2102 and with the UE 2114. The hardware 2120 may include a communication interface 2122 for setting up and maintaining a wired or wireless connection with an interface of a different communication device of the communication system 2100, as well as a radio interface 2124 for setting up and maintaining at least a wireless connection 2126 with the UE 2114 located in a coverage area (not shown in FIG. 21) served by the base station 2118. The communication interface 2122 may be configured to facilitate a connection 2128 to the host computer 2102. The connection 2128 may be direct or it may pass through a core network (not shown in FIG. 21) of the telecommunication system and/or through one or more intermediate networks outside the telecommunication system. In the embodiment shown, the hardware 2120 of the base station 2118 further includes processing circuitry 2130, which may comprise one or more programmable processors, ASICs, FPGAs, or combinations of these (not shown) adapted to execute instructions. The base station 2118 further has software 2132 stored internally or accessible via an external connection.

The communication system 2100 further includes the UE 2114 already referred to. The UE's 2114 hardware 2134 may include a radio interface 2136 configured to set up and maintain a wireless connection 2126 with a base station serving a coverage area in which the UE 2114 is currently located. The hardware 2134 of the UE 2114 further includes processing circuitry 2138, which may comprise one or more programmable processors, ASICs, FPGAs, or combinations of these (not shown) adapted to execute instructions. The UE 2114 further comprises software 2140, which is stored in or accessible by the UE 2114 and executable by the processing circuitry 2138. The software 2140 includes a client application 2142. The client application 2142 may be operable to provide a service to a human or non-human user via the UE 2114, with the support of the host computer 2102. In the host computer 2102, the executing host application 2112 may communicate with the executing client application 2142 via the OTT connection 2116 terminating at the UE 2114 and the host computer 2102. In providing the service to the user, the client application 2142 may receive request data from the host application 2112 and provide user data in response to the request data. The OTT connection 2116 may transfer both the request data and the user data. The client application 2142 may interact with the user to generate the user data that it provides.

Figure 21:
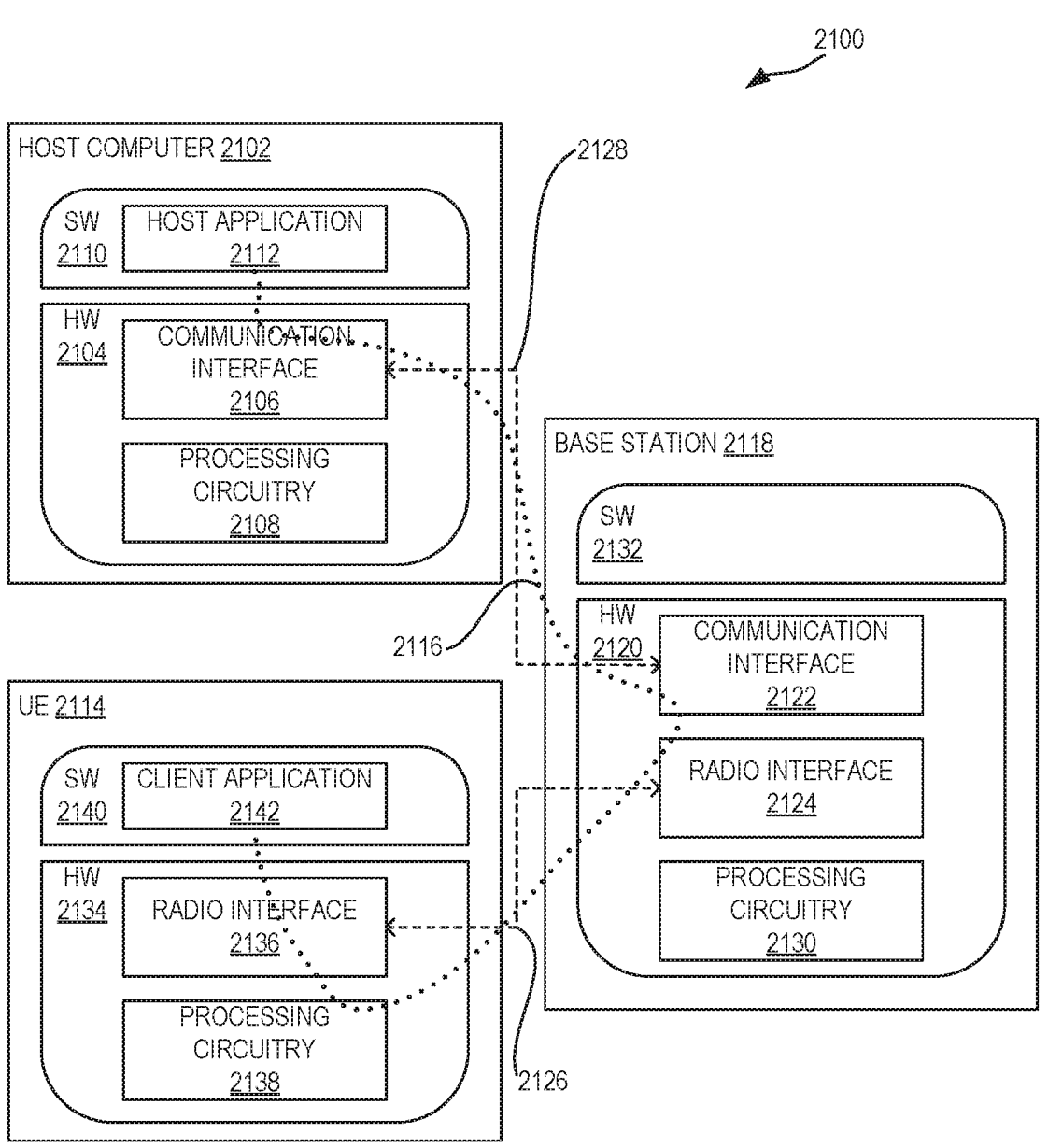
FIG. 21 is a generalized block diagram of a host computer communicating via a base station with a UE over a partially wireless connection in accordance with some embodiments of the present disclosure.

It is noted that the host computer 2102, the base station 2118, and the UE 2114 illustrated in FIG. 21 may be similar or identical to the host computer 2016, one of the base stations 2006A, 2006B, 2006C, and one of the UEs 2012, 2014 of FIG. 20, respectively. This is to say, the inner workings of these entities may be as shown in FIG. 21 and independently, the surrounding network topology may be that of FIG. 20.

In FIG. 21, the OTT connection 2116 has been drawn abstractly to illustrate the communication between the host computer 2102 and the UE 2114 via the base station 2118 without explicit reference to any intermediary devices and the precise routing of messages via these devices. The network infrastructure may determine the routing, which may be configured to hide from the UE 2114 or from the service provider operating the host computer 2102, or both. While the OTT connection 2116 is active, the network infrastructure may further take decisions by which it dynamically changes the routing (e.g., on the basis of load balancing consideration or reconfiguration of the network).

The wireless connection 2126 between the UE 2114 and the base station 2118 is in accordance with the teachings of the embodiments described throughout this disclosure. One or more of the various embodiments improve the performance of OTT services provided to the UE 2114 using the OTT connection 2116, in which the wireless connection 2126 forms the last segment. More precisely, the teachings of these embodiments may improve the e.g., security and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2116 between the host computer 2102 and the UE 2114, in response to variations in the measurement results. The measurement procedure and/or the network functionality for reconfiguring the OTT connection 2116 may be implemented in the software 2110 and the hardware 2104 of the host computer 2102 or in the software 2140 and the hardware 2134 of the UE 2114, or both. In some embodiments, sensors (not shown) may be deployed in or in association with communication devices through which the OTT connection 2116 passes; the sensors may participate in the measurement procedure by supplying values of the monitored quantities exemplified above, or supplying values of other physical quantities from which the software 2110, 2140 may compute or estimate the monitored quantities. The reconfiguring of the OTT connection 2116 may include message format, retransmission settings, preferred routing, etc.; the reconfiguring need not affect the base station 2118, and it may be unknown or imperceptible to the base station 2118. Such procedures and functionalities may be known and practiced in the art. In certain embodiments, measurements may involve proprietary UE signaling facilitating the host computer's 2102 measurements of throughput, propagation times, latency, and the like. The measurements may be implemented in that the software 2110 and 2140 causes messages to be transmitted, in particular empty or 'dummy' messages, using the OTT connection 2116 while it monitors propagation times, errors, etc.

Figures 22, 23:
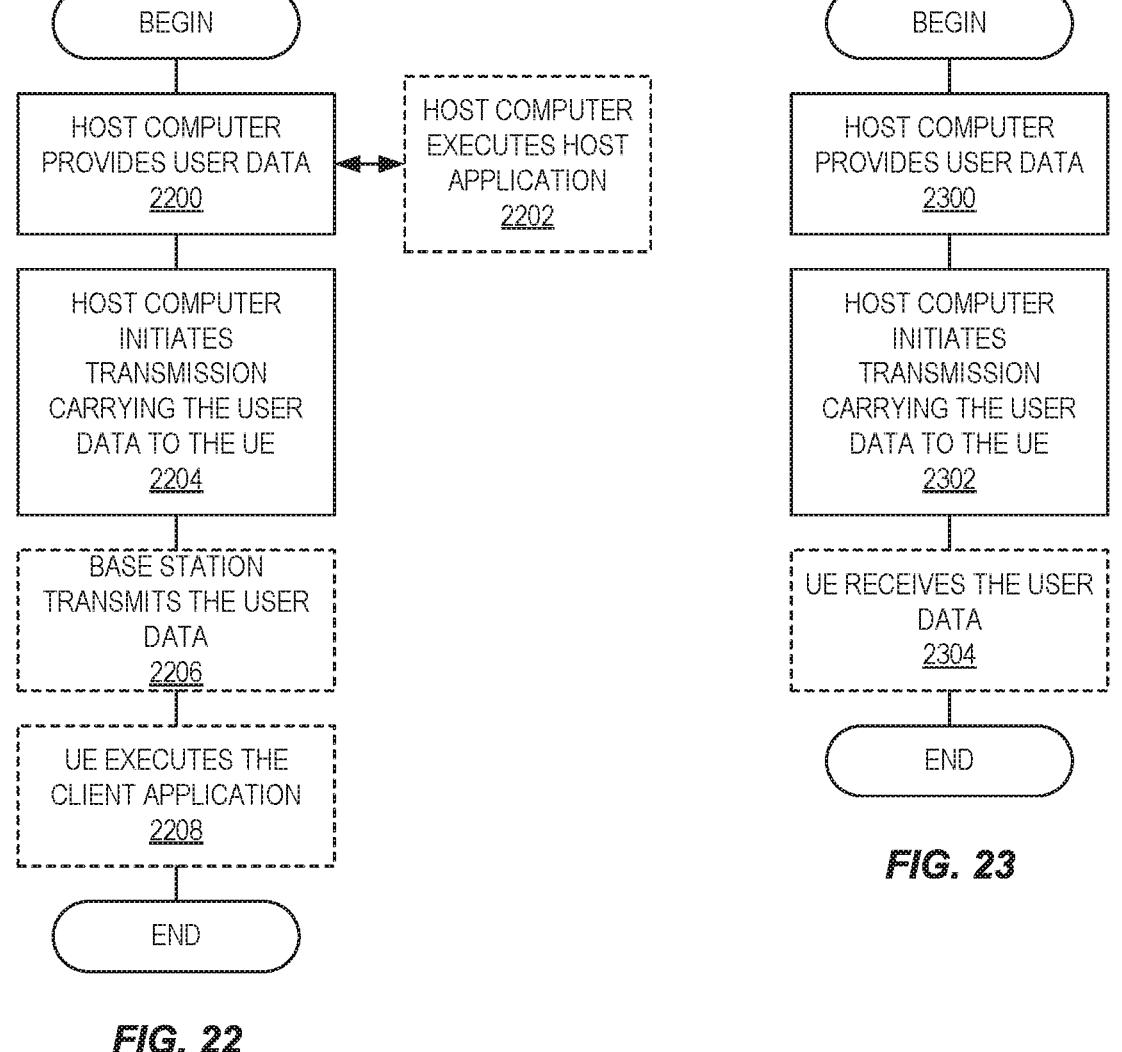
FIG. 22 is a flowchart illustrating a method implemented in a communication system in accordance with one embodiment of the present disclosure.
FIG. 23 is a flowchart illustrating a method implemented in a communication system in accordance with one embodiment of the present disclosure.

FIG. 22 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 22 will be included in this section. In step 2200, the host computer provides user data. In sub-step 2202 (which may be optional) of step 2200, the host computer provides the user data by executing a host application. In step 2204, the host computer initiates a transmission carrying the user data to the UE. In step 2206 (which may be optional), the base station transmits to the UE the user data which was carried in the transmission that the host computer initiated, in accordance with the teachings of the embodiments described throughout this disclosure. In step 2208 (which may also be optional), the UE executes a client application associated with the host application executed by the host computer.

FIG. 23 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 23 will be included in this section. In step 2300 of the method, the host computer provides user data. In an optional sub-step (not shown) the host computer provides the user data by executing a host application. In step 2302, the host computer initiates a transmission carrying the user data to the UE. The transmission may pass via the base station, in accordance with the teachings of the embodiments described throughout this disclosure. In step 2304 (which may be optional), the UE receives the user data carried in the transmission.

Figures 24, 25:
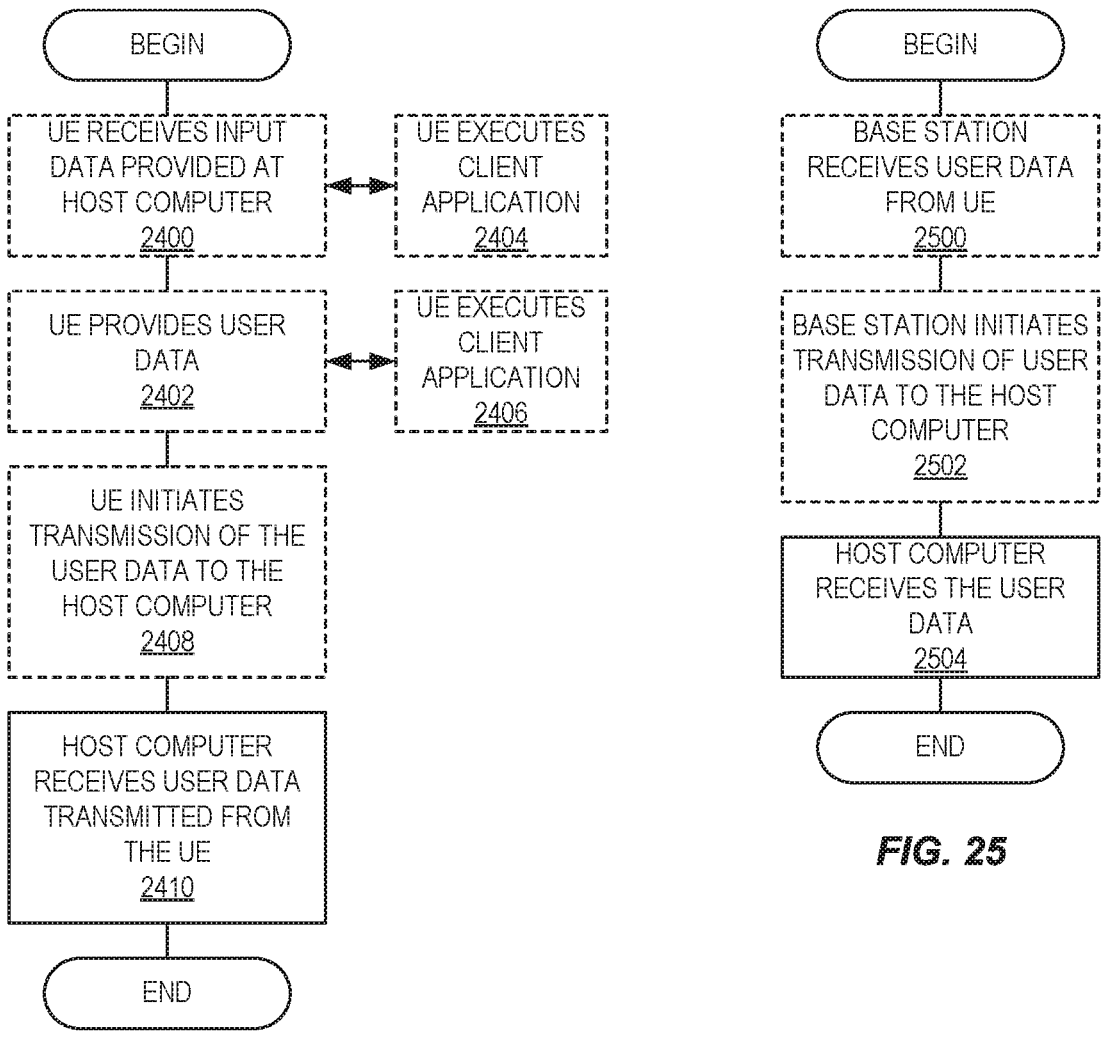
FIG. 24 is a flowchart illustrating a method implemented in a communication system in accordance with one embodiment of the present disclosure.
FIG. 25 is a flowchart illustrating a method implemented in a communication system in accordance with one embodiment of the present disclosure.

FIG. 24 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 24 will be included in this section. In step 2400 (which may be optional), the UE receives input data provided by the host computer. Additionally or alternatively, in step 2402 (which may be optional), the UE provides user data. In sub-step 2404 (which may be optional) of step 2400, the UE provides the user data by executing a client application. In sub-step 2406 (which may be optional) of step 2402, the UE executes a client application which provides the user data in reaction to the received input data provided by the host computer. In providing the user data, the executed client application may further consider user input received from the user. Regardless of the specific manner in which the user data was provided, the UE initiates, in sub-step 2408 (which may be optional), transmission of the user data to the host computer. In step 2410 of the method, the host computer receives the user data transmitted from the UE, in accordance with the teachings of the embodiments described throughout this disclosure.

FIG. 25 is a flowchart illustrating a method implemented in a communication system, in accordance with one embodiment. The communication system includes a host computer, a base station, and a UE which may be those described with reference to FIGS. 20 and 21. For simplicity of the present disclosure, only drawing references to FIG. 25 will be included in this section. In step 2500 (which may be optional), in accordance with the teachings of the embodiments described throughout this disclosure, the base station receives user data from the UE. In step 2502 (which may be optional), the base station initiates transmission of the received user data to the host computer. In step 2504 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
3PP Third Party Platform
5G Fifth Generation
5GC Fifth Generation Core
5GS Fifth Generation System
AEAD Authenticated Encryption with Associated Data
AF Application Function
AMF Access and Mobility Function
AN Access Network
AP Access Point
ASIC Application Specific Integrated Circuit
AUSF Authentication Server Function
BCCH Broadcast Control Channel
BSC Base Station Controller
BTS Base Transceiver Station
CAPEX Capital Expenditures
CPU Central Processing Unit
DL Downlink
DN Data Network
DRB Data Radio Bearers
DSP Digital Signal Processor
DTLS Datagram Transport Layer Security
eNB Enhanced or Evolved Node B
ESP Encapsulating Security Payload
FPGA Field Programmable Gate Array
GHz Gigahertz
gNB New Radio Base Station
gNB-CU New Radio Base Station Central Unit gNB-CU-CP New Radio Base Station Central Unit Control Plane gNB-CU-UP New Radio Base Station Central Unit User Plane gNB-DU New Radio Base Station Distributed Unit GPRS General Packet Radio Service GSM Global System for Mobile Communications GTP-U GPRS Tunneling Protocol HSS Home Subscriber Service IoT Internet of Things IP Internet Protocol IPsec Internet Protocol Security LTE Long Term Evolution MME Mobility Management Entity MTC Machine Type Communication MUX Multiplexer NDS Network Domain Security NEF Network Exposure Function NF Network Function NR New Radio NRF Network Function Repository Function NSSF Network Slice Selection Function OPEX Operating Expenses OTT Over-the-Top PC Personal Computer PCCH Physical Control Channel PCF Policy Control Function PDCP Packet Data Convergence Protocol PDU Protocol Data Unit P-GW Packet Data Network Gateway PNF Physical Network Function QoS Quality of Service RAM Random Access Memory RAN Radio Access Network RAT Radio Access Technology RF Radio Frequency RLC Radio Link Control RNC Radio Network Controller ROHC Robust Header Compression ROM Read Only Memory RRC Radio Resource Control RRH Remote Radio Head RRU Remote Radio Unit RU Round Trip Time SCEF Service Capability Exposure Function SCTP Steam Control Transmission Protocol SEG Security Gateway SMF Session Management Function TEID Tunnel Endpoint ID TLS Transport Layer Security UDM Unified Data Management UE User Equipment USB Universal Serial Bus VNF Virtual Network Function vRAN Virtual Radio Access Network VoIP Voice over Internet Protocol WCDMA Wideband Code Division Multiple Access WiMax Worldwide Interoperability for Microwave Access Those skilled in the art will recognize improvements and modifications to the embodiments of the present disclosure. All such improvements and modifications are considered within the scope of the concepts disclosed herein.

What is claimed is:

1. A method performed by a gNB Central Unit, gNB-CU, for communicating with a gNB-Distributed Unit, gNB-DU, the method comprising:

determining, by the gNB-CU, whether to selectively encrypt a Protocol Data Unit, PDU, to be sent, by the gNB-CU, to the gNB-DU if the PDU is not otherwise encrypted;

in response to determining to selectively encrypt the PDU to be sent to the gNB-DU, encrypting, by the gNB-CU, the PDU to be sent to the gNB-DU;

in response to determining to not selectively encrypt the PDU to be sent to the gNB-DU, passing, by the gNB-CU, the PDU to be sent to the gNB-DU; and transmitting, by the gNB-CU, the PDU to be sent to the gNB-DU;

wherein transmitting the PDU to be sent to the gNB-DU comprises:

transmitting the PDU to an Internet Protocol Security, IPsec, Security Gateway, SEG, for transmission to the gNB-DU.

2. The method of claim 1 wherein:

the gNB-CU comprises a first multiplexer, MUX, and;

transmitting the PDU to the IPsec SEG comprises transmitting the PDU from the first MUX to a second MUX in the IPsec SEG.

3. The method of claim 1 wherein:

determining whether to selectively encrypt the PDU to be sent to the gNB-DU comprises determining to selectively encrypt the PDU if one or more of the group consisting of:

the PDU comprises "type=0" and "User data existence flag=0"; and the PDU comprises: "type=0"; "User data existence flag=1"; and the PDU is a Packet Data Convergence Protocol, PDCP, Control PDU.

4. The method of claim 1 wherein:

determining whether a PDU received from the gNB-DU was selectively encrypted;

in response to determining the received PDU was selectively encrypted, decrypting the received PDU to be sent to the gNB-CU.

5. The method of claim 1 wherein the received PDU is received from the IPsec SEG.

6. The method of claim 5 wherein:

receiving the received PDU from the IPsec SEG comprises receiving the received PDU by the first MUX from the second MUX in the IPsec SEG.

7. The method of claim 1 wherein a secure session is established between the gNB-CU and the IPsec SEG.

8. The method of claim 7 wherein the secure session between the gNB-CU and the IPsec SEG is established when one of the group consisting of:

a first PDCP instance created in the gNB-CU;

on demand;

upon signaling from the gNB-CU;

upon setting up an interface between a gNB-CU User Plane (gNB-CU-UP) and a gNB-CU Control Plane (gNB-CU-CP), E1;

upon setting up an interface between the gNB-CU and the gNB-DU, F1; and at creation of the gNB-CU-UP.

9. The method of claim 1 wherein encrypting the PDU to be sent to the gNB-DU comprises encrypting the PDU using a symmetric encryption key.

10. The method of claim 4 wherein encrypting the PDU uses a first encryption key and decrypting the received PDU uses a second encryption key where the first encryption key is different than the second encryption key.

11. The method of claim 1 wherein the gNB-CU operates in a first container.

12. The method of claim 11 wherein the first MUX operates in the first container.

13. The method of claim 12 wherein:
the first MUX operates in a second container; and
the first container and the second container operate in a same pod.

14. A method performed by an Internet Protocol Security, IPsec, Security Gateway, SEG, for facilitating communication between a gNB-Distributed Unit, gNB-DU and a gNB Central Unit, gNB-CU, the method comprising:
determining, by the IPsec SEG, whether to selectively encrypt a Protocol Data Unit, PDU, to be sent to the gNB-CU from the gNB-DU if the PDU is not otherwise encrypted;
in response to determining to selectively encrypt the PDU to be sent to the gNB-CU, encrypting, by the IPsec SEG, the PDU to be sent to the gNB-CU;
in response to determining to not selectively encrypt the PDU to be sent to the gNB-CU, passing, by the IPsec SEG, the PDU to be sent to the gNB-CU; and
transmitting, by the IPsec SEG, the PDU to the gNB-CU.

15. The method of claim 14 wherein:
the IPsec SEG comprises a first multiplexer, MUX, and;
transmitting the PDU to the gNB-CU comprises transmitting the PDU from the first MUX to a second MUX in the gNB-CU.

16. The method of claim 14 wherein:
determining whether to selectively encrypt the PDU to be sent to the gNB-CU comprises determining to selectively encrypt the PDU if one or more of the group consisting of:
the PDU is a Radio Link Control, RLC,-to-Packet Data Convergence Protocol, PDCP, indication;
the PDU comprises "type=0" and "User data existence flag=0";
the PDU comprises: "type=0"; "User data existence flag=1"; and the PDU is a PDCP Control PDU;
the PDU is a PDCP Control PDU;
the PDU is a Downlink, DL, Data Delivery Status indication; and
the PDU is an Assistance Information Data indication.

17. The method of claim 14 wherein:
determining whether a PDU received from the gNB-CU was selectively encrypted;
in response to determining the received PDU was selectively encrypted, decrypting the received PDU to be sent to the gNB-DU.

18. A processing node for implementing a gNB Central Unit, gNB-CU, for communicating with a gNB-Distributed Unit, gNB-DU, the processing node comprising:
one or more processors; and
memory comprising instructions to cause the processing node to:
determine, by the gNB-CU, whether to selectively encrypt a Protocol Data Unit, PDU, to be sent to the gNB-DU if the PDU is not otherwise encrypted;
in response to determining to selectively encrypt the PDU to be sent to the gNB-DU, encrypt, by the gNB-CU, the PDU to be sent to the gNB-DU;
in response to determining to not selectively encrypt the PDU to be sent to the gNB-DU, pass, by the gNB-CU, the PDU to be sent to the gNB-DU;
transmit, by the gNB-CU, the PDU to be sent to the gNB-DU.

19. A processing node for implementing an Internet Protocol Security, IPsec, Security Gateway, SEG, for facilitating communication between a gNB-Distributed Unit, gNB-DU and a gNB Central Unit, gNB-CU, the processing node comprising:
one or more processors; and
memory comprising instructions to cause the processing node to:
determine, by the IPsec SEG, whether to selectively encrypt a Protocol Data Unit, PDU, to be sent to the gNB-CU from the gNB-DU if the PDU is not otherwise encrypted;
in response to determining to selectively encrypt the PDU to be sent to the gNB-CU, encrypt, by the IPsec SEG, the PDU to be sent to the gNB-CU;
in response to determining to not selectively encrypt the PDU to be sent to the gNB-CU, pass, by the IPsec SEG, the PDU to be sent to the gNB-CU; and
transmit, by the IPsec SEG, the PDU to the gNB-CU.

* * * * *